(12) United States Patent
Wang et al.

(10) Patent No.: US 11,240,847 B2
(45) Date of Patent: Feb. 1, 2022

(54) BEAM DETERMINING METHOD PERFORMED DURING UPLINK RANDOM ACCESS, USER EQUIPMENT AND BASE STATION

(71) Applicant: NTT DOCOMO, INC., Tokyo (JP)

(72) Inventors: Jing Wang, Beijing (CN); Liu Liu, Beijing (CN); Huiling Jiang, Beijing (CN); Kazuaki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/340,638

(22) PCT Filed: Nov. 20, 2017

(86) PCT No.: PCT/CN2017/111808
§ 371 (c)(1),
(2) Date: Apr. 9, 2019

(87) PCT Pub. No.: WO2018/064988
PCT Pub. Date: Apr. 12, 2018

(65) Prior Publication Data
US 2020/0053788 A1 Feb. 13, 2020

(30) Foreign Application Priority Data
Oct. 9, 2016 (CN) .......................... 201610881894.9

(51) Int. Cl.
*H04W 72/04* (2009.01)
*H04W 74/08* (2009.01)
(Continued)

(52) U.S. Cl.
CPC ...... *H04W 74/0833* (2013.01); *H04B 7/0695* (2013.01); *H04B 7/088* (2013.01)

(58) Field of Classification Search
None
See application file for complete search history.

(56) References Cited

U.S. PATENT DOCUMENTS 8,542,648 B2 * 9/2013 Vujcic ..................... H04L 23/02
370/330
9,215,650 B2 12/2015 Jung
(Continued)

FOREIGN PATENT DOCUMENTS

CN 103688474 A 3/2014
CN 103891161 A 6/2014
(Continued)

OTHER PUBLICATIONS

International Preliminary Report on Patentability regarding PCT/CN2017/111808, including the English translation of the Written Opinion, dated Apr. 9, 2019.
(Continued)

*Primary Examiner* — Sithu Ko
(74) *Attorney, Agent, or Firm* — Osha Bergman Watanabe & Burton LLP

(57) ABSTRACT

A beam determining method performed in an uplink random access procedure, a user equipment, and a base station are disclosed. The user equipment has a plurality of RX beams, the base station has a plurality of TX beams. A beam determining method performed by a user equipment includes: determining an available RX beam among the plurality of RX beams of the user equipment and an available TX beam among the plurality of TX beams of the base station according to downlink synchronization signals transmitted by the base station; notifying the base station of information indicating the available TX beam of the base station implicitly.

6 Claims, 9 Drawing Sheets

(51) Int. Cl.
*H04B 7/06* (2006.01)
*H04B 7/08* (2006.01)

(56) References Cited

U.S. PATENT DOCUMENTS

| | | | |
|---|---|---|---|
| 10,009,083 B2 | 6/2018 | Yang et al. | |
| 10,111,108 B2 | 10/2018 | Shen et al. | |
| 10,375,733 B2 | 8/2019 | Jeong et al. | |
| 10,736,148 B2* | 8/2020 | Li | H04W 74/0833 |
| 2013/0301567 A1* | 11/2013 | Jeong | H04W 74/0833 370/329 |
| 2016/0029358 A1* | 1/2016 | Hou | H04W 74/0833 370/329 |
| 2016/0157267 A1 | 6/2016 | Frenne et al. | |
| 2016/0192401 A1* | 6/2016 | Park | H04W 72/046 370/329 |
| 2017/0238344 A1* | 8/2017 | McGowan | H04W 74/0833 370/329 |
| 2017/0367120 A1* | 12/2017 | Murray | H04W 72/046 |
| 2019/0028942 A1* | 1/2019 | Tang | H04W 74/002 |
| 2019/0104549 A1* | 4/2019 | Deng | H04B 7/0617 |
| 2019/0141752 A1* | 5/2019 | Kim | H04B 7/0617 |
| 2019/0174536 A1* | 6/2019 | Han | H04W 74/002 |
| 2019/0174551 A1* | 6/2019 | Liu | H04W 74/0833 |
| 2019/0254078 A1* | 8/2019 | Zhang | H04W 72/0446 |
| 2019/0327764 A1* | 10/2019 | Yoo | H04W 74/085 |

FOREIGN PATENT DOCUMENTS

| | | |
|---|---|---|
| CN | 104285385 A | 1/2015 |
| CN | 105830481 A | 8/2016 |
| WO | WO-2015141066 A1 | 9/2015 |
| WO | 2016086144 A1 | 6/2016 |

OTHER PUBLICATIONS

International Search Report regarding PCT/CN2017/111808, dated Feb. 22, 2018.
Extended European Search Report issued in the counterpart European Patent Application No. 17857869.6, dated Apr. 9, 2020 (11 pages).
Nokia, Alcatel-Lucent Shanghai Bell; "Beam Management in Initial Access"; 3GPP TSG-RAN WG1#86bis, R1-1610288; Lisbon, Portugal, Oct. 10-14, 2016 (4 pages).
ZTE; "Beamformed Random Access in NR"; 3GPP TSG RAN WG1 Meeting #86, R1-166419; Gothenburg, Sweden, Aug. 22-26, 2016 (8 pages).
NTT Docomo, Inc.; "Design for RACH procedure for NR"; 3GPP TSG RAN WG1 Meeting #86bis, R1-1610057; Lisbon, Portugal, Oct. 10-14, 2016 (4 pages).
Office Action in counterpart European Patent Application No. 17 857 869.6 dated Mar. 1, 2021 (8 pages).
Office Action in counterpart Japanese Patent Application No. 2019-519297 dated Aug. 3, 2021 (8 pages).

* cited by examiner

BEAM DETERMINING METHOD PERFORMED DURING UPLINK RANDOM ACCESS, USER EQUIPMENT AND BASE STATION

CROSS-REFERENCE TO RELATED APPLICATIONS

This application is the U.S. National Phase Application under 35 U.S.C. 371 of International Application No. PCT/CN2017/111808 filed on Nov. 20, 2017, which application claims the benefit of priority from Chinese Patent Application No. 201610881894.9, filed on Oct. 9, 2016. The entire disclosures of the above applications are incorporated herein by reference.

TECHNICAL FIELD

The present disclosure relates to uplink random access (RA), and particularly to a beam determining method that can be performed during an uplink RA procedure of user equipment, and the corresponding user equipment and base station.

BACKGROUND

In a high-frequency scenario of 5G, or in a scenario where a user equipment (UE) is connected to a 5G transmit-receive point (base station) and a long-term evolution (LTE) base station via dual connectivity, it is proposed to apply beam formed technology in the UE and the base station, that is, both the base station and the UE can use a plurality of beams for signal transmission and reception. Each transmission (TX) beam of the base station and each reception (RX) beam of the UE form a downlink beam pair, and each RX beam of the base station and each TX beam of the UE form an uplink beam pair. However, not all signals transmitted via each downlink beam pair can obtain good reception quality at the UE side, nor do all signals transmitted via each uplink beam pair obtain good reception quality at the base station side.

Therefore, in order to improve the performance of the wireless communication system, it is required to determine a preferred TX beam and a preferred RX beam of the UE, and a preferred TX beam and a preferred RX beam of the base station, so as to be able to use the preferred beams in RA performed by the UE to the base station and in subsequent communications. However, it has not been proposed at present about how to determine the preferred TX beam and the preferred RX beam of the UE and the preferred TX beam and the preferred RX beam of the base station.

SUMMARY OF THE INVENTION

According to an embodiment of the present disclosure, there is provided a beam determining method performed by a user equipment during an uplink random access procedure in a communication system including a base station and the user equipment, the user equipment having a plurality of RX beams, and the base station having a plurality of TX beams, the method comprising: determining an available RX beam among the plurality of RX beams of the user equipment and an available TX beam among the plurality of TX beams of the base station according to downlink synchronization signals transmitted by the base station; notifying the base station of information indicating the available TX beam of the base station implicitly.

According to another embodiment of the present disclosure, there is provided a beam determining method performed by a base station during an uplink random access procedure in a communication system including the base station and a user equipment, the user equipment having a plurality of RX beams, and the base station having a plurality of TX beams, the method comprising: transmitting downlink synchronization signals to the user equipment; determining an available TX beam of the base station according to information, which is implicitly notified by the user equipment and indicates the available TX beam of the base station.

According to another embodiment of the present disclosure, there is provided a beam determining method performed by a user equipment during an uplink random access procedure in a communication system including a base station and the user equipment, the user equipment having omnidirectional antennas, and the base station having a plurality of TX beams, the method comprising: determining an available TX beam among the plurality of TX beams of the base station according to downlink synchronization signals transmitted by the base station; notifying the base station of information indicating the available TX beam of the base station implicitly.

According to another embodiment of the present disclosure, there is provided a beam determining method performed by a base station during an uplink random access procedure in a communication system including the base station and a user equipment, the user equipment having omnidirectional antennas, and the base station having a plurality of TX beams, the method comprising: transmitting downlink synchronization signals to the user equipment; determining an available TX beam of the base station according to information, which is implicitly notified by the user equipment and indicates the available TX beam of the base station.

According to another embodiment of the present disclosure, there is provided a user equipment used in a communication system including a base station and the user equipment, the user equipment having a plurality of RX beams, and the base station having a plurality of TX beams, the user equipment comprising: a determining unit, configured to determine an available RX beam among the plurality of RX beams of the user equipment and an available TX beam among the plurality of TX beams of the base station according to downlink synchronization signals transmitted by the base station; a notifying unit, configured to notify the base station of information indicating the available TX beam of the base station implicitly.

According to another embodiment of the present disclosure, there is provided a base station used in a communication system including the base station and a user equipment, the user equipment having a plurality of RX beams, and the base station having a plurality of TX beams, the base station comprising: a transmitting unit, configured to transmit downlink synchronization signals to the user equipment; a determining unit, configured to determine an available TX beam of the base station according to information, which is implicitly notified by the user equipment and indicates the available TX beam of the base station.

According to another embodiment of the present disclosure, there is provided a user equipment used in a communication system including a base station and the user equipment, the user equipment having omnidirectional antennas, and the base station having a plurality of TX beams, the user equipment comprising: a determining unit, configured to determine an available TX beam among the plurality of TX beams of the base station according to downlink synchronization signals transmitted by the base station; a notifying unit, configured to notify the base station of information indicating the available TX beam of the base station implicitly.

According to another embodiment of the present disclosure, there is provided a base station used in a communication system including the base station and a user equipment, the user equipment having omnidirectional antennas, and the base station having a plurality of TX beams, the base station comprising: a transmitting unit, configured to transmit downlink synchronization signals to the user equipment; a determining unit, configured to determine an available TX beam of the base station according to information, which is implicitly notified by the user equipment and indicates the available TX beam of the base station.

BRIEF DESCRIPTION OF THE DRAWINGS

The above and other objects, features and advantages of the present invention will become more apparent according to a detailed description of the embodiments of the present disclosure with reference to the drawings. The drawings are intended to provide a further understanding of the embodiments of the invention, and form a part of the specification, used to explain the present disclosure together with the embodiments of the present disclosure, but do not constitute a limitation of the present disclosure. In the figures, the same reference numbers generally refer to the same parts or steps.

DESCRIPTION OF THE EMBODIMENTS

In order to make the objects, technical solutions and advantages of the present disclosure more apparent, the exemplary embodiments according to the present disclosure will be described in detail below with reference to the accompanying drawings. It is apparent that the described embodiments are only a part of the embodiments of the present disclosure, but not all of the embodiments of the present disclosure, and it is being understood that the present disclosure is not limited by the exemplary embodiments described herein. Based on the embodiments of the present disclosure described in the present disclosure, all other embodiments obtained by those skilled in the art without creative work should fall into the protection scope of the present disclosure.

Figure 1:
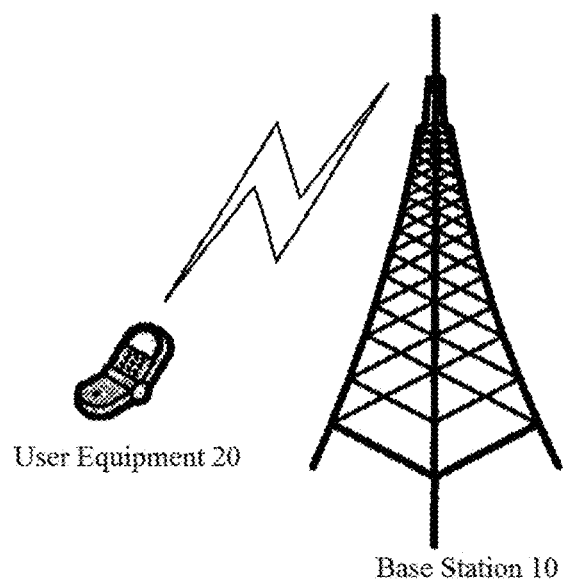
FIG. 1 is a schematic diagram of a mobile communication system in accordance with an embodiment of the present disclosure.

First, a wireless communication system according to an embodiment of the present disclosure will be described with reference to FIG. 1. As shown in FIG. 1, the wireless communication system may comprise a base station 10 and a user equipment (UE) 20. The UE 20 receives downlink synchronization signals transmitted by the base station 10 so as to synchronize with the base station 10. The UE 20 then performs RA to the base station 10. It should be acknowledged that although one base station and one UE are shown in FIG. 1, it is merely illustrative and the wireless communication system may comprise one or more base stations and one or more UEs. In addition, the base station 10 can be a Transmission Reception Point (TRP), or may manage a plurality of TRPs, hereinafter, the terms "base station" and "TRP" are used interchangeably.

The base station 10 may have a plurality of directional antennas, that is, the base station 10 may have a plurality of TX beams and a plurality of RX beams, so that signals transmitted by a UE may be received by a plurality of RX beams, and signals may be transmitted to UE by a plurality of TX beams. In addition, in some scenarios, the UE 20 may have a plurality of directional antennas, that is, the UE 20 may have a plurality of TX beams and a plurality of RX beams, so that signals transmitted by a base station may be received by a plurality of RX beams, and signals may be transmitted to a base station by a plurality of TX beams. In other scenarios, the UE 20 may have an omni antenna so as to transmit and receive signals by only one beam (omni beam). In the beam transmission and beam reception between the base station 10 and the UE 20, the transmission method using the beam can be appropriately controlled according to whether or not the beam applied to the transmission coincides with the beam applied to the reception by the base station 10 (or the UE 20). The case where the beam applied to the transmission coincides with the beam applied to the reception in the base station 10 or the like may also be referred to as being capable of utilizing (supporting) transmission/reception reciprocity. On the other hand, the case where the beam applied to the transmission and the beam applied to the reception is inconsistent may also be referred to as not utilizing (not supporting) transmission/reception reciprocity. Here, the beam applied to the transmission and the beam applied to the reception is not limited to being totally consistent, and the case where they are consistent in a predetermined tolerance range may be included. In addition, the transmission/reception reciprocity may also be referred to as transmission/reception beam correspondence, transmission/reception correspondence, beam correspondence and correspondence. In addition, the base station 10 may or may not support correspondence (beam correspondence, reciprocity), and the UE 20 may or may not support correspondence (beam correspondence, reciprocity).

Hereinafter, a synchronization procedure with a base station and a RA procedure to the base station performed by a UE will be described with reference to FIG. 2 (taking a contention-based RA procedure as an example).

Figure 2:
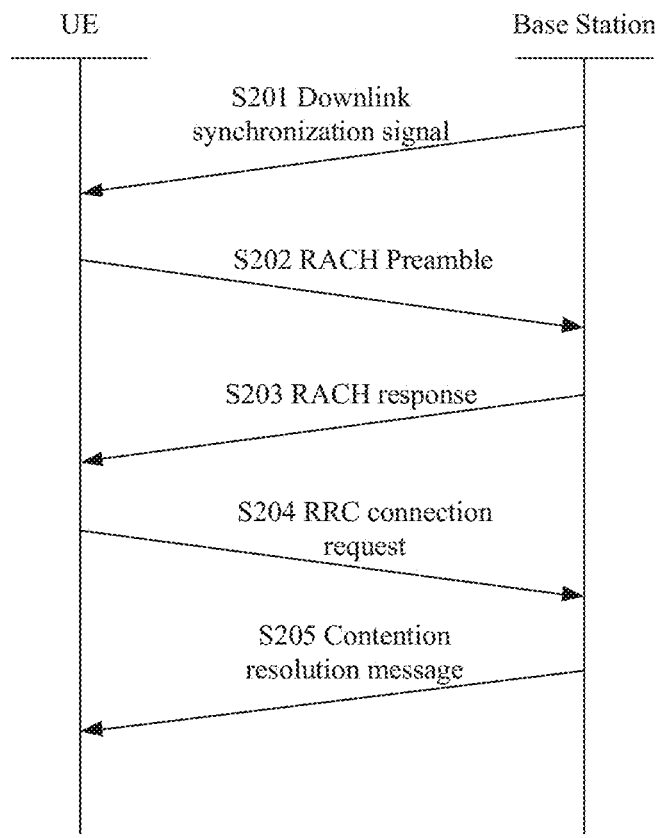
FIG. 2 is a flow chart schematically showing a synchronization procedure with a base station and a RA (contention-based) procedure to the base station performed by a UE.

As shown in FIG. 2, in step S201, the base station transmits downlink synchronization signals, such as primary synchronization signals (PSS) and/or secondary synchronization signals (SSS), to the UE. Based on the downlink synchronization signals, the UE acquires synchronization with the base station. In step S202, the UE transmits random access preamble (RA preamble) to the base station through physical random access channel (PRACH). In step S203, in response to the RA preamble, the base station transmits a random access response (RAR) to the UE, where the RAR includes timing adjustment information, information indicating uplink resources allocated for the UE, and a Radio Network Temporary Identity (RNTI) temporarily allocated for the UE, and the like. In step S204, the UE transmits an RRC connection request to the base station by using resources allocated by the base station. In step S205, the base station transmits a contention resolution message to the UE, so that the UE determines the RA is successful. The UE then begins subsequent communication procedures with the base station. In embodiments of the present disclosure, an available TX beam of the base station and/or an available RX beam of the UE are determined by step S201, and an available RX beam of the base station and/or an available TX beam of the UE are determined by steps S202 and S203. Here, the available TX beam of the base station refers to a preferred TX beam used in the RA procedure (e.g., steps S204 and S205) and in other communication procedures with the UE, and determined from the plurality of TX beams of the base station according to the embodiments of the present disclosure, and the available RX beam of the base station refers to a preferred RX beam used in the RA procedure (e.g., steps S204 and S205) and in other communication procedures with the UE, and determined from the plurality of RX beams of the base station according to the embodiments of the present disclosure. The available TX beam of the UE refers to a preferred TX beam used in the RA procedure (e.g., steps S204 and S205) and in other communication procedures with the base station, and determined from the plurality of TX beams of the UE according to the embodiments of the present disclosure, and the available RX beam of the UE refers to a preferred RX beam used in the RA procedure (e.g., steps S204 and S205) and in other communication procedures with the base station, and determined from the plurality of RX beams of the UE according to the embodiments of the present disclosure.

First Embodiment

Hereinafter, a beam determining method according to a first embodiment of the present disclosure will be described. In the first embodiment, both the UE and the base station have a plurality of directional antennas, where the UE has a plurality of TX beams and a plurality of RX beams, and the base station has a plurality of TX beams and a plurality of RX beams.

Figure 3:
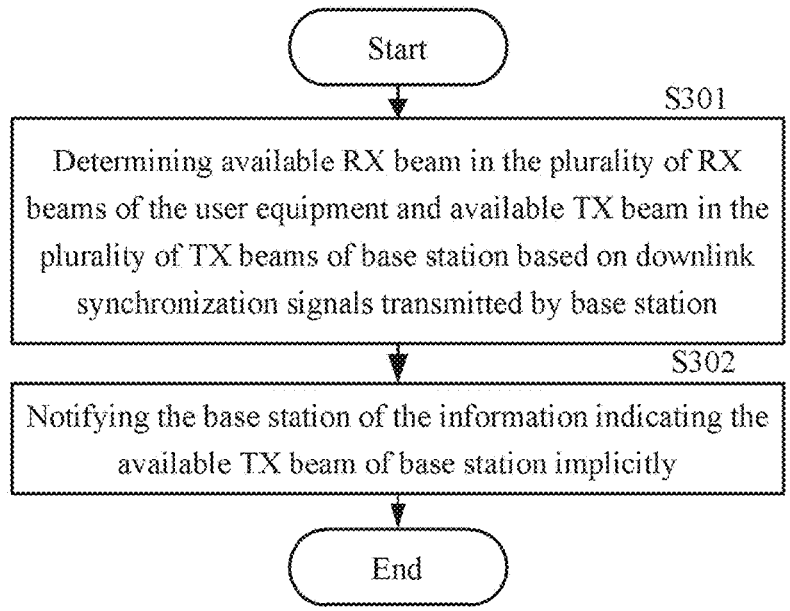
FIG. 3 is a beam determining method performed by a user equipment during an uplink random access procedure according to a first embodiment of the present disclosure.

FIG. 3 illustrates a beam determining method performed by a UE according to the first embodiment of the present disclosure. According to this method, the UE may determine the available RX beam of the UE and the available TX beam of the base station, and implicitly notify the base station of the determined available TX beam of the base station. In addition, the UE may also determine the available TX beam of the UE according to signals transmitted by the base station.

As shown in FIG. 3, in step S301, determining an available RX beam of the UE and an available TX beam of the base station according to downlink synchronization signals transmitted by the base station.

Figure 4:
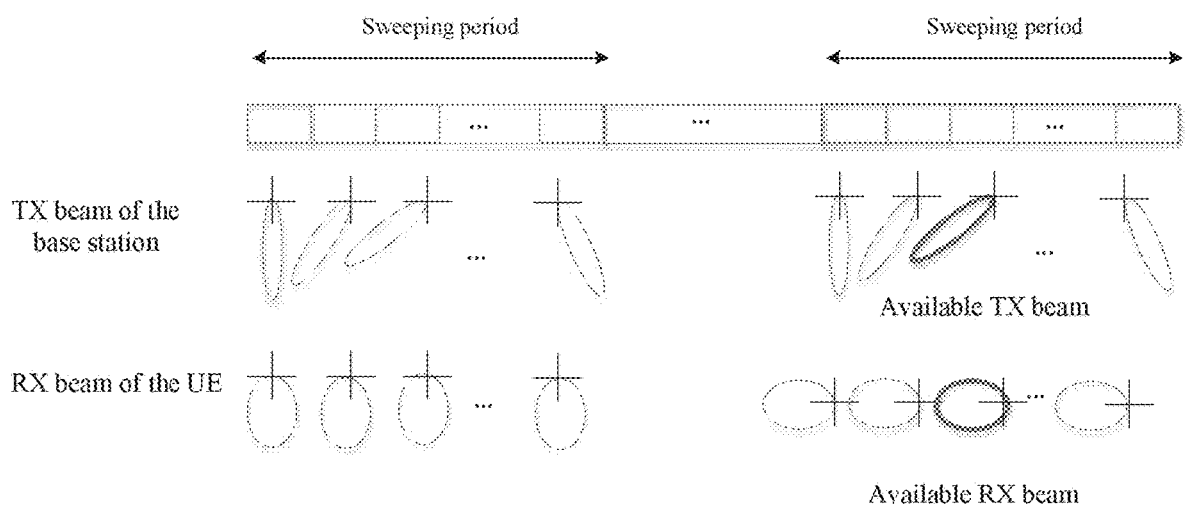
FIG. 4 is a schematic diagram showing a method in which a base station transmits downlink synchronization signals and a UE receives the downlink synchronization signals.

Specifically, in order to determine the available TX beam of the base station and the available RX beam of the UE from the plurality of TX beams of the base station and the plurality of RX beams of the UE, a plurality of sweeping periods may be set, and each sweeping period may include a plurality of time units (symbols). The number of the time units in each sweeping period may be the same as the number of the TX beams of the base station. The base station may transmit downlink synchronization signals to the UE in each time unit of the sweeping period by using one TX beam corresponding to this time unit, that is, the base station may perform sweeping of the TX beam, so that in each sweeping period the downlink synchronization signals may be transmitted once by using all of the TX beams of the base station respectively. On the other hand, in each sweeping period of the plurality of sweeping periods, the UE may receive, by using one RX beam, the downlink synchronization signals transmitted by the base station using the plurality of TX beams. FIG. 4 is a schematic diagram showing a method in which a base station transmits downlink synchronization signals and a UE receives the downlink synchronization signals.

Then, the UE may select one downlink synchronization signal that satisfies a condition from the various downlink synchronization signals received in the plurality of sweeping periods. The condition may be any condition set as needed.

For example, the condition may be the reception quality being the best, in which case the reception qualities of various downlink synchronization signals can be compared and the downlink synchronization signal with the best reception quality is selected. In another example, the condition may be the reception quality exceeding a certain preset threshold, in which case the reception qualities of various downlink synchronization signals may be compared with the threshold and any downlink synchronization signal with the reception quality greater than the threshold is selected.

Next, the UE may determine the RX beam by which the selected downlink synchronization signal is received as the available RX beam of the UE, and determine the TX beam of the base station corresponding to the time unit in which the selected downlink synchronization signal is received as the available TX beam of the base station. The sweeping manner of the base station (in other words, the corresponding relationship between various TX beams of the base station and various time units (symbols) in the sweeping period) may be preset in the UE and in the base station, or may be set by the base station and notified to the UE through RACH configuration. In the example shown in FIG. 4, the RX beam of the UE drawn by the thick line is determined as the available RX beam of the UE, and the TX beam of the base station drawn by the thick line is determined as the available TX beam of the base station.

Returning to FIG. 3, in step S302, the UE may implicitly notify the base station of information indicating the available TX beam of the base station.

In embodiments of the present disclosure, according to whether the base station supports correspondence, the available TX beam of the base station may be implicitly notified to the base station in different manners. Specifically, whether the base station supports correspondence can be determined according to the RACH configuration which is transmitted by the base station and includes information indicating whether the base station supports correspondence. For example, one bit indicating whether the base station supports correspondence can be set in the RACH configuration, and the RACH configuration is transmitted to the UE by the base station, so that the UE can determine whether the base station supports correspondence according to the value of the bit. For example, the base station can be determined to support correspondence when the value of the bit is 1, and the base station can be determined not to support correspondence when the value of the bit is 0.

Figure 5:
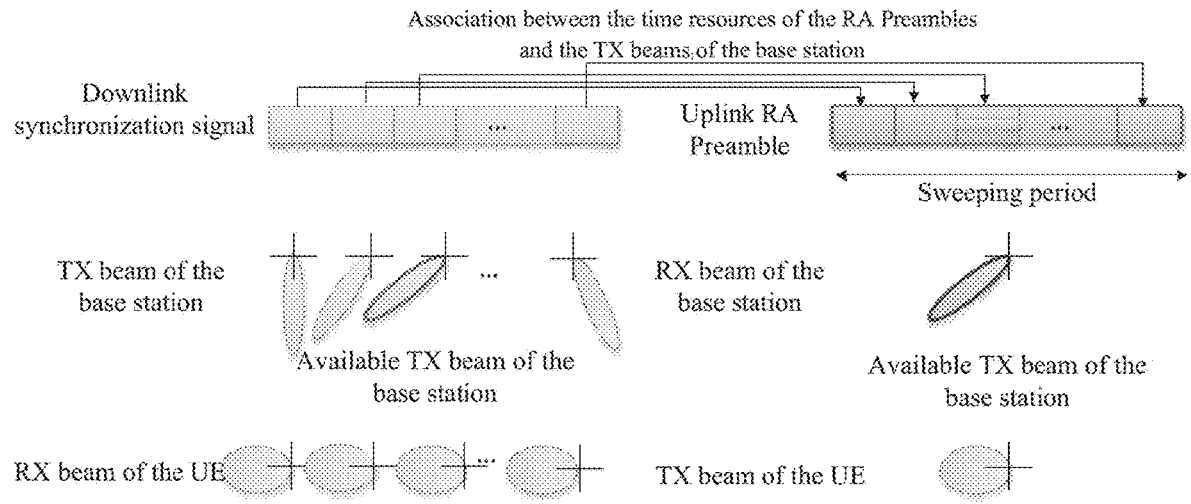
FIG. 5 shows an example in which the UE implicitly notifies the base station of the available TX beam of the base station.

In the case where the base station supports correspondence, since the base station can determine the available RX (TX) beam of the base station according to the available TX (RX) beam of the base station by utilizing the correspondence, and thus the UE only needs to transmit RA preamble once to the available RX beam of the base station in one sweeping period. In this case, the UE may transmit the RA preamble to the base station on time resources corresponding to the available TX beam of the base station. Specifically, a corresponding relationship between the time resources of various RA preambles on which the UE can transmit and various TX beams of the base station may be preset in the base station and in the UE, or the corresponding relationship may be set in the base station and the RACH configuration indicating this corresponding relationship is transmitted to the UE. In this way, the UE may determine the time resources of the RA preamble corresponding to the available TX beam of the base station according to the corresponding relationship, and transmit the RA preamble to the base station on this time resources. In this way, when receiving the RA preamble transmitted by the UE, the base station may determine the TX beam corresponding to the time resources used by the preamble as the available TX beam of the base station according to the corresponding relationship. FIG. 5 shows an example in this case, in which the UE implicitly notifies the base station of the available TX beam of the base station. As shown in FIG. 5, it is assumed that the available TX beam of the UE determined by the UE is the third TX beam (that is, the TX beam 3) shown in FIG. 5, and the TX beam 3 is associated with the third time unit in the sweeping period. Then UE may transmit the RA preamble to the base station on the time resources corresponding to the TX beam 3 (the third time unit of the sweeping period). In this way, when receiving the RA preamble, the base station can determine the TX beam 3 as the available TX beam of the base station according to the time resources corresponding to this RA preamble.

In the case where the base station does not support correspondence, the UE may determine, according to the RACH configuration which is transmitted by the base station and includes information indicating each TX beam of the base station and the RA preambles associated with this TX beam, the RA preambles associated with the available TX beam of the base station, and the UE may transmit the RA preambles associated with the available TX beam of the base station to the base station (e.g., to any RX beam of the base station). Specifically, an association relationship between each TX beam of the base station and the RA preambles transmitted by the UE may be preset in the base station and in the UE, or the association relationship may be set in the base station and the RACH configuration which includes information indicating this association relationship (i.e., the RACH configuration indicating each TX beam of the base station and the RA preambles associated with this TX beam) is transmitted to the UE. In this way, when receiving the RA preambles transmitted by the UE, the base station can determine the TX beam of the base station associated with the RA preambles as the available TX beam of the base station. Here, the association relationship between the TX beam of the base station and the RA preambles may be set in any suitable manner. For example, RA preambles may be divided into a plurality of groups according to indexes of the RA preambles, and each TX beam of the base station corresponds to a RA preamble group. Table 1 below shows an example of grouping RA preambles according to the indexes of the RA preambles. In this example, the base station has 8 TX beams, and there are 64 candidate RA preambles which are divided into 8 preamble groups, where 3 bits are used to indicate the sequence number of each preamble group:

TABLE 1

| Preamble group | Corresponding preambles |
| --- | --- |
| 000 | 0-7 |
| 001 | 8-15 |
| ... | ... |
| 111 | 56-63 |

Each TX beam of the base station can then be associated with a corresponding preamble group, as shown in Table 2 below:

TABLE 2

| TX beam of the base station | Preamble group |
|---|---|
| TX beam 1 | 000 |
| TX beam 2 | 001 |
| ... | ... |
| TX beam 8 | 111 |

In this way, when the UE determines that the available TX beam of the base station is, for example, the TX beam 2, the RA preambles associated with this TX beam is determined to be the preambles 8-15 in the preamble group 001 according to the above association relationship, thereby one of the preambles 8-15 is selected and transmitted to the base station. At the base station side, when receiving one of the preambles 8-15, the base station may determine that the TX beam notified by the UE is the TX beam 2 corresponding to one of the preambles 8-15 according to the above association relationship, thereby determining the TX beam 2 as the available TX beam of the base station.

Through the above steps, the UE may utilize the downlink synchronization signals transmitted by the base station to determine the available RX beam of the UE and the available TX beam of the base station, and notify the base station of the available TX beam of the base station in different manners, so that the base station acknowledges the available TX beam of the base station.

As described above, in order to efficiently perform RA and other communication procedures, the available TX beam of the UE and the available RX beam of the base station are then determined. In a first embodiment of the present disclosure, this procedure may have different implementations depending on whether the UE and the base station support correspondence and the number of TX beams that the UE can use in one sweeping period. As described above, the UE may determine whether the base station supports correspondence according to the RACH configuration which is transmitted by the base station and includes information indicating whether the base station supports correspondence. Of course, if the UE knows in advance whether the base station supports correspondence, the base station is not required to notify the UE whether the base station supports correspondence through the RACH configuration, and the UE is not required to perform the above determination.

In a first implementation, the UE supports correspondence, and the base station also supports correspondence. In this implementation, the UE may determine, by utilizing correspondence, the available TX beam of the UE according to the available RX beam of the UE determined in step S301. In addition, because the UE transmits the RA preambles to the base station on the time resources corresponding to the available TX beam of the base station as described with reference to step S302, so that the base station determines the available TX beam of the base station according to the manner described above, thus the base station may determine, by utilizing correspondence, the available RX beam of the base station according to the available TX beam of the base station.

In a second implementation, the UE supports correspondence and the base station does not support correspondence, or the base station supports correspondence but does not use correspondence (that is, the base station does not notify the UE of the base station supporting correspondence). In this implementation, the UE may determine, by utilizing correspondence, the available TX beam of the UE according to the available RX beam of the UE determined in step S301. The UE may then transmit the RA preambles to the plurality of RX beams of the base station using the available TX beam of the UE during a sweeping period. For example, in a first time unit of the sweeping period, the UE may transmit the RA preambles to the first RX beam of the base station by using the available TX beam, and in a second time unit of the sweeping period the UE may transmit the RA preambles to the second RX beam of the base station by using the available TX beam, and so on. In this way, the base station can receive a plurality of RA preambles from the same user equipment, determine the RA preamble that satisfies a condition among the plurality of RA preambles, and determine the RX beam by which the determined RA preamble is received as the available RX beam of the base station corresponding to the user equipment. As described above, the condition may be any condition set as needed. For example, the condition may be the reception quality being the best, or the reception quality exceeding a certain preset threshold.

In a third implementation, the UE does not support correspondence, or the UE supports correspondence but does not use correspondence, the base station supports correspondence, and in one sweeping period the UE transmits RA preambles to the base station by using one TX beam.

Figure 6:
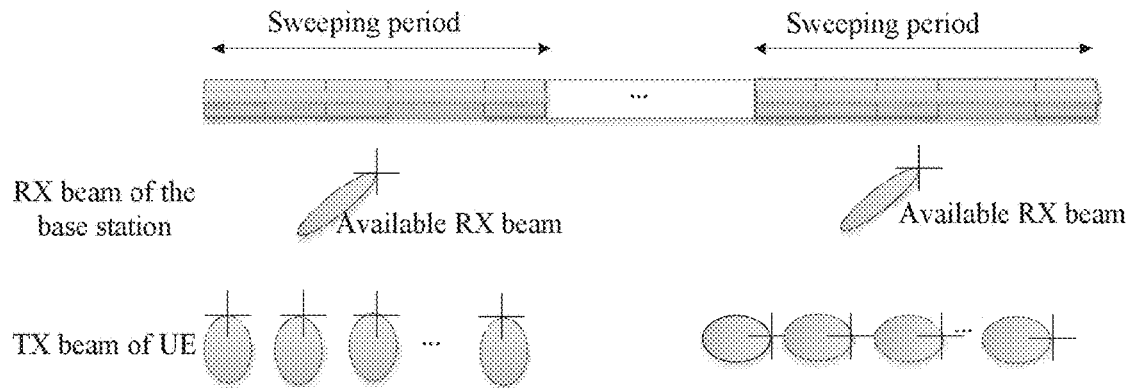
FIG. 6 shows an example in which in each sweeping period the UE transmits the random access (RA) preambles associated with this sweeping period to the available RX beam of the base station by using one TX beam.

In this implementation, the UE may determine, by utilizing correspondence, the available RX beam of the base station according to the available TX beam of the base station determined in step S301. Then, in each sweeping period of the plurality of sweeping periods, the UE may transmit the RA preambles associated with this sweeping period to the available RX beam of the base station by using one TX beam, where the TX beams used in different sweeping periods can be different, as shown in FIG. 6. Of course, in some cases, some of the TX beams used in different sweeping periods may be the same, some may be different.

Specifically, in a first example of this implementation, in the case where the offset (x) of the sweeping period in which the UE transmits the RA preambles relative to the sweeping period in which the base station transmits the downlink synchronization signals is notified by the RACH configuration received from the base station, in each sweeping period of the plurality of sweeping periods, the UE may transmit the RA preambles associated with this sweeping period to the available RX beam of the base station by using one TX beam, where the TX beams associated with different sweeping periods can be different, and the RA preambles associated with different sweeping periods can be different.

In the first example, at the base station side, the base station may determine, by utilizing correspondence, the available RX beam of the base station according to the available TX beam of the base station notified in step S302. Then, in each sweeping period of the plurality of sweeping periods, the base station may utilize the available RX beam to receive the RA preambles associated with this sweeping period and transmitted by the UE. Then, the base station may determine the RA preamble that satisfies the condition for the UE from a plurality of RA preambles received in each sweeping period. As described above, the condition may be any condition set as needed. For example, the condition may be the reception quality being the best, or the reception quality exceeding a certain preset threshold. The RA preambles determined by the base station correspond to the available TX beam of the UE.

In a second example of the implementation, in the case where the offset (x) of the sweeping period in which the UE transmits the RA preambles relative to the sweeping period in which the base station transmits the downlink synchronization signals and the length (y) of the sweeping period in which the UE transmits the RA preambles are notified by the RACH configuration received from the base station, in each sweeping period of the plurality of sweeping periods, the UE may transmit the RA preambles to the plurality of RX beams of the base station by using one TX beam, where the TX beams used in different sweeping periods can be different, but the RA preambles transmitted in different sweeping periods need to be the same.

In this second example, at the base station side, the base station may determine, by utilizing correspondence, the available RX beam of the base station according to the available TX beam of the base station notified in step S302. Then, in each sweeping period of the plurality of sweeping periods, the base station may utilize the available RX beam to receive the RA preambles associated with this sweeping period and transmitted by the UE. Then, the base station may determine the RA preamble that satisfies the condition for the UE from the RA preambles received in each sweeping period. The RA preamble determined by the base station corresponds to the available TX beam of the UE.

The base station can then implicitly notify the UE of the available TX beam of the UE.

As a first example of the base station notifying the UE of the available TX beam of the UE, the base station may calculate the Radio Network Temporary Identity (RNTI) corresponding to the RA preamble according to the time resources and frequency resources of the determined RA preamble, and transmit an RA response (RAR) to the UE by utilizing the available TX beam of the base station in response to the determined RA preamble, where the RAR is scrambled by using the determined RNTI. For example, the base station may calculate the RNTI corresponding to the determined RA preamble by utilizing the following formula:

$$\text{RNTI} = f(t\_id, f\_id) \quad (1)$$

Where t_id is an index of the time resources of the determined RA preamble, and f_id is an index of the frequency resources of the determined RA preamble. For example, in LTE system, $$\text{RNTI} = f(t\_id, f\_id) = 1 + t\_id + 10 * f\_id \quad (2)$$

In embodiments of the present disclosure, the RNTI corresponding to the determined RA preamble may be calculated by using the above formula (1) or (2) in LTE system. The base station can then scramble the RAR transmitted in response to the RA preamble with the RNTI calculated from the determined RA preamble.

Accordingly, at the UE side, the UE may calculate the RNTI of each RA preamble according to the above formulas and based on the time resources and frequency resources of each previously transmitted RA preamble. The UE may receive the RAR transmitted by the base station, and attempt to descramble the control channel of the received RAR by utilizing the RNTI of various RA preambles respectively, so as to determine the RNTI by which the control channel of the RAR is successfully descrambled. Then, the UE may determine the TX beam by which the RA preamble corresponding to the determined RNTI is transmitted as the available TX beam of the UE.

As a second example of the base station notifying the UE of the available TX beam of the UE, the base station may use the physical resources corresponding to the RA which corresponds to the physical resources of the determined RA preamble, based on a predetermined association relationship between the physical resources of the RAR and the physical resources of the RA preambles, to transmit the RAR, which is transmitted in response to the determined RA preamble, to the UE by the available TX beam of the base station. Here, the physical resources may be the time resources. For example, an association relationship between the time resources of each RA preamble and the time resources of the RAR transmitted in response to the RA preamble (for example, an offset between the time resources of each RA preamble and the time resources of the RAR transmitted in response to the RA preamble) may be preset in the UE and in the base station, or the association relationship may be set in the base station and the RACH configuration including information that indicates this association relationship is transmitted to the UE. Accordingly, at the UE side, the UE may receive the RAR transmitted by the base station using the available TX beam of the base station, and determine the RA preamble which is transmitted by using the physical resources that associates with the physical resources of the received RAR based on a predetermined association relationship between the physical resources of the RAR and the physical resources of the RA preambles, and determine the TX beam by which the determined RA preamble is transmitted as the available TX beam of the UE. For example, in a case where the offset between the time resources of each RA preamble and the time resources of the RAR transmitted in response to the RA preamble is set as the association relationship, the UE may subtract the offset from the transmission time of the RAR, thereby determining the transmission time of the RA preamble corresponding to the RAR, and then determine the TX beam by which the RA preamble is transmitted at this transmission time as the available TX beam of the UE.

In a fourth implementation, the UE does not support correspondence, or the UE supports correspondence but does not use correspondence, the base station supports correspondence, and in one sweeping period, the UE can transmit RA preambles to the base station on different physical resources by using a plurality of TX beams simultaneously.

Figure 7:
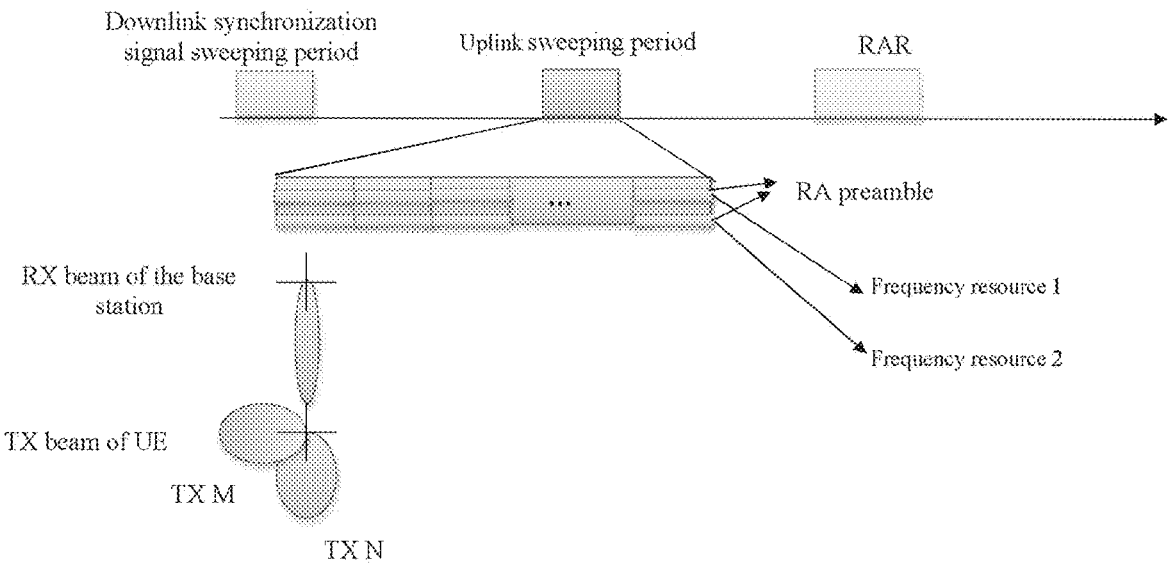
FIG. 7 shows an example in which the UE transmits the same RA preamble in one sweeping period to the available RX beam of the base station on different frequency resources by using two TX beams.

In this implementation, the UE may determine, by utilizing correspondence, the available RX beam of the base station according to the available TX beam of the base station determined in step S301. Then, in each sweeping period of the plurality of sweeping periods, the UE may transmit the RA preambles associated with this sweeping period to the available RX beam of the base station on different physical resources by using a plurality of TX beams associated with this sweeping period. Here, the RA preambles transmitted by the plurality of TX beams within the same sweeping period are the same. FIG. 7 shows an example in which, in the fourth implementation, the UE transmits the same RA preamble in one sweeping period to the available RX beam of the base station on different frequency resources by using two TX beams.

Specifically, in each sweeping period of the plurality of sweeping periods, the UE may transmit the RA preambles associated with this sweeping period to the available RX beam of the base station on different physical resources by using a plurality of TX beams associated with this sweeping period, where the TX beams associated with different sweeping periods are different from each other, and the RA preambles associated with different sweeping periods are the same. For example, in a first sweeping period the UE transmits the RA preambles to the available RX beam of the base station by using a first TX beam and a second TX beam, and in a second sweeping period the UE transmits the RA preambles to the available RX beam of the base station by using a third TX beam and a fourth TX beam, and so on.

In the above example, the physical resources of the RA preambles transmitted by using the TX beam may be determined in association with each TX beam of the UE. For example, the physical resources may be frequency resources. In this case, for example, each TX beam of the UE may be allocated a unique ID, and the frequency resources of the RA preambles transmitted by using the TX beam is determined as a function of the IDs of the UE TX beams and the frequency offsets of the frequency resources corresponding to various TX beams. For example, the physical resources of the RA preambles transmitted by using the TX beam may be determined in advance in association with each TX beam of the UE, and may be set in the UE and in the base station, or the physical resources of the RA preambles transmitted by using the TX beam may be determined by the base station in association with each TX beam of the UE, and the RACH configuration including information that indicates this physical resources is transmitted to the UE. In this way, the physical resources of the RA preambles transmitted by using different TX beams can be different.

At the base station side, the base station may determine, by utilizing correspondence, the available RX beam of the base station according to the available TX beam of the base station notified in step S302. Then, the base station may utilize the available RX beam to receive a plurality of RA preambles transmitted by the UE in each sweeping period, and select the RA preamble that satisfies the condition from the various RA preambles received in the plurality of sweeping periods. As described above, the condition may be any condition set as needed. For example, the condition may be the reception quality being the best, or may be the reception quality exceeding a certain preset threshold. The selected RA preamble corresponds to the available TX beam of the UE.

The base station can then implicitly notify the UE of the available TX beam of the UE. Specifically, the base station may calculate the Radio Network Temporary Identity (RNTI) corresponding to the RA preamble according to the time resources and frequency resources of the determined RA preamble, and transmit an RA response (RAR) to the UE by utilizing the available TX beam of the base station in response to the determined RA preamble, where the RAR is scrambled by using the determined RNTI. For example, the base station may calculate the RNTI corresponding to the determined RA preamble by utilizing the above formula (1) or (2), and then scramble the RAR transmitted in response to the RA preamble with the RNTI calculated according to the determined RA preamble.

Accordingly, at the UE side, the UE may calculate the RNTI of each RA preamble according to the above formulas and based on the time resources and frequency resources of each previously transmitted RA preamble. The UE may receive the RAR transmitted by the base station, and attempt to descramble the control channel of the received RAR by utilizing the RNTI of various RA preambles respectively, so as to determine the RNTI by which the control channel of the RAR is successfully descrambled. Then, the UE may determine the TX beam by which the RA preamble corresponding to the determined RNTI is transmitted as the available TX beam of the UE.

In a fifth implementation, the UE does not support correspondence, or the UE supports correspondence but does not use correspondence, the base station supports correspondence, and in one sweeping period, the UE can transmit different RA preambles to the base station on the same physical resources by using the plurality of TX beams simultaneously.

Figure 8:
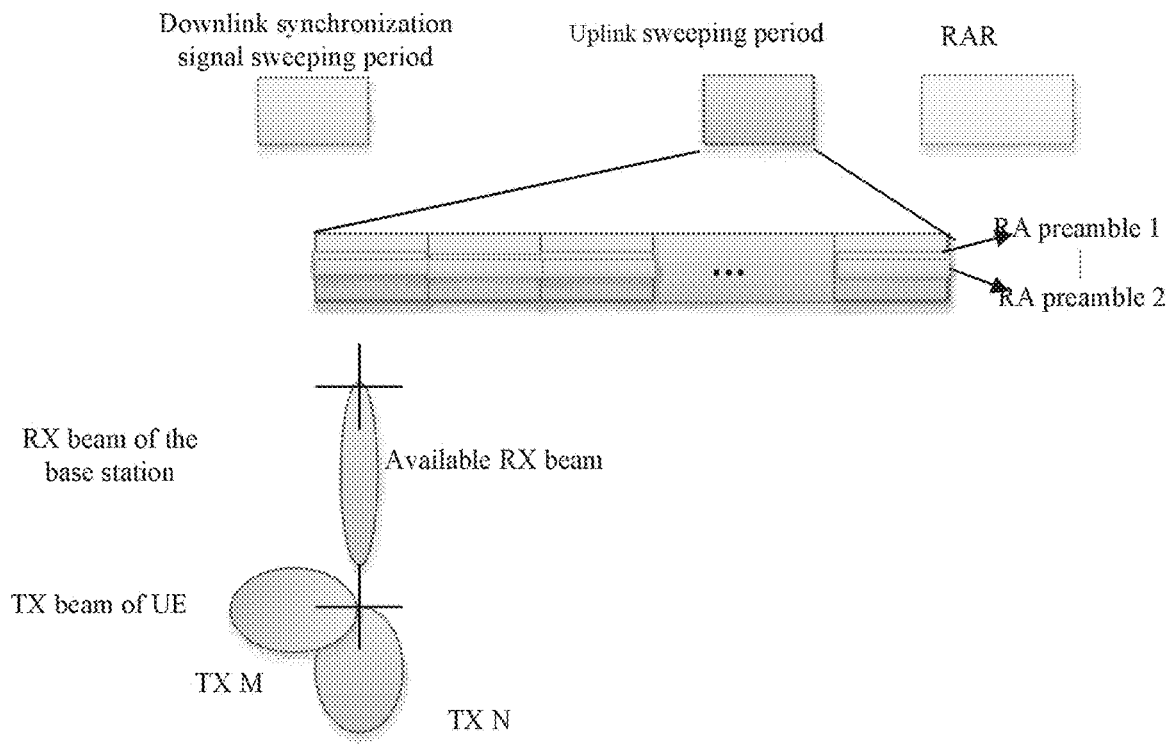
FIG. 8 shows an example in which the UE transmits two different RA preambles in one sweeping period to the available RX beam of the base station on the same frequency resources by using two TX beams simultaneously.

In this implementation, the UE may determine, by utilizing correspondence, the available RX beam of the base station according to the available TX beam of the base station determined in step S301. Then, in each sweeping period of the plurality of sweeping periods, the UE may transmit different RA preambles to the available RX beam of the base station on the same physical resources by using the plurality of TX beams associated with the sweeping period. For example, in a first sweeping period the UE may transmit a first RA preamble and a second preamble to the available RX beam of the base station on the same physical resources by using a first TX beam and a second TX beam, and in a second sweeping period the UE may transmit a third RA preamble and a fourth preamble to the available RX beam of the base station on the same physical resources by using a third TX beam and a fourth TX beam. FIG. 8 shows an example in which, in the fifth implementation, the UE transmits two different RA preambles in one sweeping period to the available RX beam of the base station on the same frequency resources by using two TX beams simultaneously.

At the base station side, the base station may determine, by utilizing correspondence, the available RX beam of the base station according to the available TX beam of the base station notified in step S302. Then, the base station may utilize the available RX beam to receive a plurality of RA preambles transmitted by the UE in each sweeping period, and transmit the RARs in response to each RA preamble, where each RAR is scrambled by using the RNTI corresponding to the RA preamble.

At the UE side, the UE may receive a plurality of RARs transmitted by the base station using the available TX beam of the base station, and descramble at least one of the plurality of RARs by using the RNTIs corresponding to various transmitted RA preambles respectively, so as to determine the RNTIs by which the at least one of the RARs is successfully descrambled, then, the UE may determine the TX beam by which the RA preamble corresponding to one of the determined RNTIs is transmitted as the available TX beam of the UE. For example, the UE may descramble all of the plurality of RARs by using the RNTIs corresponding to various transmitted RA preambles respectively, so as to determine the RNTIs by which the plurality of RARs are successfully descrambled, then, the UE may select an RNTI from the determined RNTIs, and determine the TX beam by which the RA preamble corresponding to one of the determined RNTIs is transmitted as the available TX beam of the UE. Alternatively, the UE may descramble the plurality of RARs one by one by using the RNTIs corresponding to various transmitted RA preambles respectively, so as to determine a first RNTI by which achieving successful descrambling, and determine the TX beam by which the RA preamble corresponding to the determined RNTI is transmitted as the available TX beam of the UE.

In a sixth implementation, neither the UE nor the base station supports correspondence, or the UE and the base station support correspondence but do not use correspondence, and in one sweeping period, the UE may transmit the RA preamble to the base station by using one TX beam.

In this implementation, in each sweeping period of the plurality of sweeping periods, the UE may transmit the RA preambles associated with this sweeping period to the plurality of RX beams of the base station by using one TX beam associated with this sweeping period.

Figure 9:
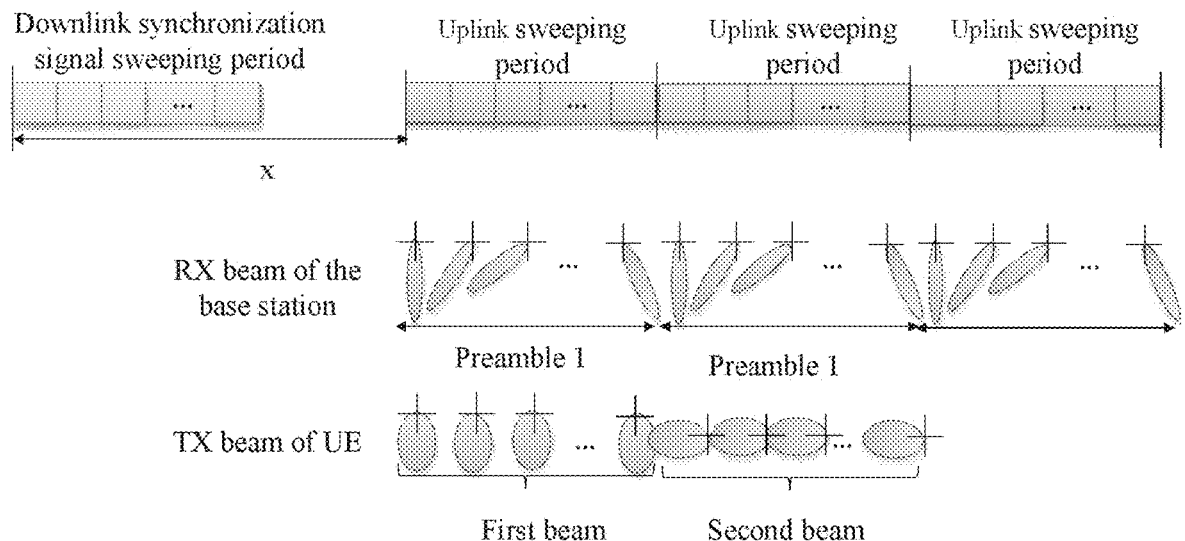
FIG. 9 shows an example in which the offset of the sweeping period in which the UE transmits the RA preambles relative to the sweeping period in which the base station transmits the downlink synchronization signals is notified by the Random Access Channel (RACH) configuration received from the base station.

Specifically, in a first example of the implementation, in the case where the offset (x) of the sweeping period in which the UE transmits the RA preamble relative to the sweeping period in which the base station transmits the downlink synchronization signals is notified by the RACH configuration received from the base station, in each sweeping period of the plurality of sweeping periods, the UE may transmit the RA preambles associated with this sweeping period to the plurality of RX beams of the base station by using one TX beam associated with this sweeping period, where the TX beams associated with different sweeping periods are different, and the RA preambles associated with different sweeping periods are different. FIG. 9 shows this example schematically.

In the first example, at the base station side, in each sweeping period of the plurality of sweeping periods, the base station may use the plurality of RX beams to receive the RA preambles associated with this sweeping period and transmitted by the UE. Then, the base station may determine the RA preamble that satisfies the condition from a plurality of RA preambles received in each sweeping period. As described above, the condition may be any condition set as needed. For example, the condition may be the reception quality being the best, or the reception quality exceeding a certain preset threshold. The RA preamble determined by the base station corresponds to the available TX beam of the UE.

Figure 10:
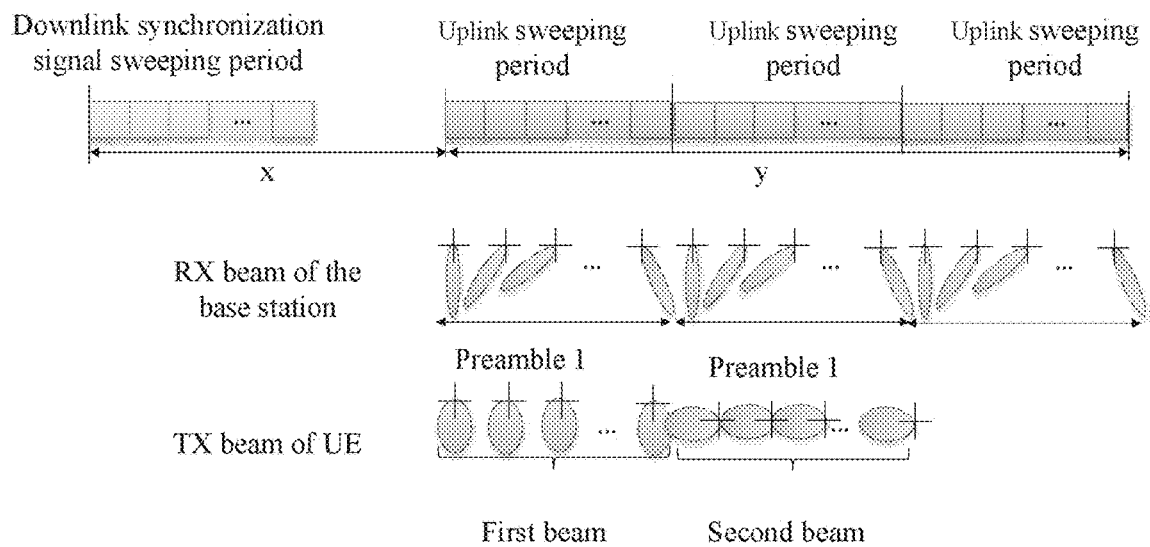
FIG. 10 is a diagram showing an example in which the offset of the sweeping period in which the UE transmits the RA preambles relative to the sweeping period in which the base station transmits the downlink synchronization signals and the length of the sweeping period in which the UE transmits the RA preambles are notified by the RACH configuration received from the base station.

In a second example of the implementation, in the case where the offset (x) of the sweeping period in which the UE transmits the RA preambles relative to the sweeping period in which the base station transmits the downlink synchronization signals and the length (y) of the sweeping period in which the UE transmits the RA preambles are notified by the RACH configuration received from the base station, in each sweeping period of the plurality of sweeping periods, the UE may transmit the RA preambles associated with this sweeping period to the plurality of RX beams of the base station by using one TX beam associated with this sweeping period, where the TX beams associated with different sweeping periods are different, and the RA preambles associated with different sweeping periods are the same. FIG. 10 shows this example schematically.

In the second example, at the base station side, in each sweeping period of the plurality of sweeping periods, the base station may use the plurality of RX beams to receive the RA preambles associated with this sweeping period and transmitted by the UE. Then, the base station may determine the RA preamble that satisfies the condition for the UE from a plurality of RA preambles received in various sweeping periods. The RA preamble determined by the base station corresponds to the available TX beam of the UE.

The base station can then implicitly notify the UE of the available TX beam of the UE.

As a first example of the base station notifying the UE of the available TX beam of the UE, the base station may transmit RAR by using the available TX beam of the base station in response to the RA preamble determined for each sweeping period, where the RAR is scrambled by using the RNTI corresponding to the corresponding RA preamble. The base station may calculate the RNTI corresponding to the determined RA preamble in the manner described above and use the RNTI to scramble the RAR transmitted in response to the determined RA preamble, and details are not described herein again. Here, since the RA preambles transmitted by the UE in different sweeping periods are different from each other, the base station will transmit one RAR for the RA preamble received in each sweeping period.

Accordingly, at the UE side, the UE may receive a plurality of RARs transmitted by the base station using the available TX beam of the base station, and descramble at least one of the plurality of RARs by using the RNTIs corresponding to the transmitted RA preamble in various sweeping periods respectively, so as to determine the RNTIs by which the at least one of the RARs is successfully descrambled, then determine the TX beam by which the RA preamble corresponding to one of the determined RNTIs is transmitted as the available TX beam of the UE. For example, the UE may descramble all of the plurality of RARs by using the RNTIs corresponding to various transmitted RA preambles respectively, so as to determine the RNTIs by which the plurality of RARs are successfully descrambled, then, the UE may select one RNTI from the determined RNTIs, and determine the TX beam by which the RA preamble corresponding to one of the determined RNTIs is transmitted as the available TX beam of the UE. Alternatively, the UE may descramble the plurality of RARs one by one by using the RNTIs corresponding to various transmitted RA preambles respectively, so as to determine a first RNTI by which achieving successful descrambling, and determine the TX beam by which the RA preamble corresponding to the determined RNTI is transmitted as the available TX beam of the UE.

As a second example of the base station notifying the UE of the available TX beam of the UE, the base station may use the physical resources corresponding to the RA which corresponds to the physical resources of the determined RA preamble based on a predetermined association relationship between the physical resources of the RAR and the physical resources of the RA preamble, and transmit the RAR, which is transmitted in response to the determined RA preamble, to the UE by the available TX beam of the base station. Here, the physical resources may be the time resources. For example, an association relationship between the time resources of each RA preamble and the time resources of the RAR transmitted in response to the RA preamble (for example, an offset between the time resources of each RA preamble and the time resources of the RAR transmitted in response to the RA preamble) may be preset in the UE and in the base station, or the association relationship may be set in the base station and the RACH configuration including information that indicates this association relationship is transmitted to the UE.

Correspondingly, at the UE side, the UE may receive a plurality of RARs transmitted by the base station using the available TX beam of the base station, and determine the RA preambles corresponding to at least one of the received plurality of RARs, based on a predetermined association relationship between the physical resources of the RAR and the physical resources of the RA preambles, thereby determining the TX beam by which one of the determined RA preambles is transmitted as the available TX beam of the UE. For example, the UE may determine the RA preambles corresponding to the received plurality of RARs respectively, select one RA preamble from the determined RA preambles arbitrarily, and determine the TX beam by which the determined RA preamble is transmitted as the available TX beam of the UE. Alternatively, the UE may select one RAR from the plurality of RARs and determine an RA preamble corresponding to the selected RAR, thereby determining the TX beam by which the determined RA preamble is transmitted as the available TX beam of the UE.

In a seventh implementation, neither the UE nor the base station supports correspondence, or the UE and the base station support correspondence but do not use correspondence, and in one sweeping period, the UE may transmit the same RA preamble to the base station on different frequency resources by using the plurality of TX beams.

Figure 11:
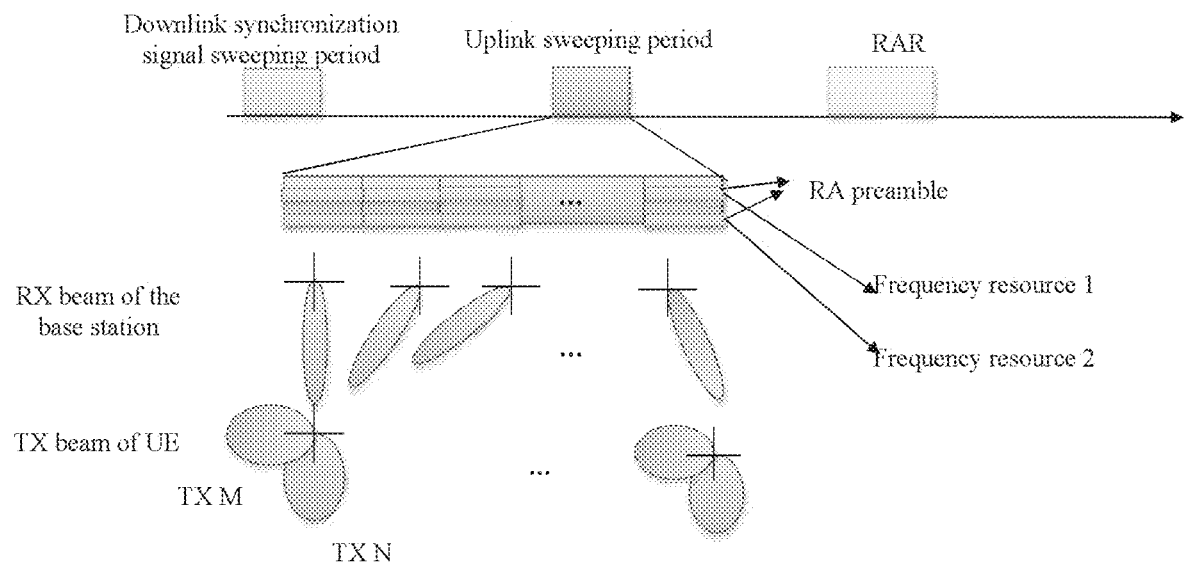
FIG. 11 shows an example in which the UE transmits the same RA preamble in one sweeping period to the available RX beam of the base station on different frequency resources by using two TX beams.

In this implementation, in each sweeping period of the plurality of sweeping periods, the UE may transmit the RA preambles to the plurality of RX beams of the base station on different physical resources by using a plurality of TX beams associated with this sweeping period. FIG. 11 shows an example in which, in the seventh implementation, the UE transmits the same RA preamble in one sweeping period to the available RX beam of the base station on different frequency resources by using two TX beams.

At the base station side, the base station may utilize the plurality of RX beams to receive a plurality of RA preambles transmitted by the UE in each sweeping period, and select the RA preamble that satisfies the condition from the various RA preambles received in the plurality of sweeping periods. As described above, the condition may be any condition set as needed. For example, the condition may be the reception quality being the best, or may be the reception quality exceeding a certain preset threshold. The base station can then implicitly notify the UE of the available TX beam of the UE. Specifically, the base station may calculate the Radio Network Temporary Identity (RNTI) corresponding to the RA preamble according to the time resources and frequency resources of the determined RA preamble, and transmit RA response (RAR) to the UE by utilizing the available TX beam of the base station in response to the determined RA preamble, where the RAR is scrambled by using the determined RNTI. For example, the base station may calculate the RNTI corresponding to the determined RA preamble by utilizing the above formula (1) or (2), and then scramble the RAR transmitted in response to the RA preamble with the RNTI calculated according to the determined RA preamble.

Accordingly, at the UE side, the UE may calculate the RNTI of each RA preamble according to the above formulas and based on the time resources and frequency resources of each previously transmitted RA preamble. The UE may receive at least one of the RARs transmitted by the base station, and descramble the received at least one of the RARs by utilizing the RNTI of various RA preambles respectively, so as to determine at least one of the RNTIs by which the at least one of the RARs is successfully descrambled. Then, the UE may determine the TX beam by which the RA preamble corresponding to the determined one of the RNTIs is transmitted as the available TX beam of the UE.

In an eighth implementation, neither the UE nor the base station supports correspondence, or the UE and the base station support correspondence but do not use correspondence, and in one sweeping period, the UE may transmit different RA preambles to the base station on the same frequency resource by using the plurality of TX beams.

Figure 12:
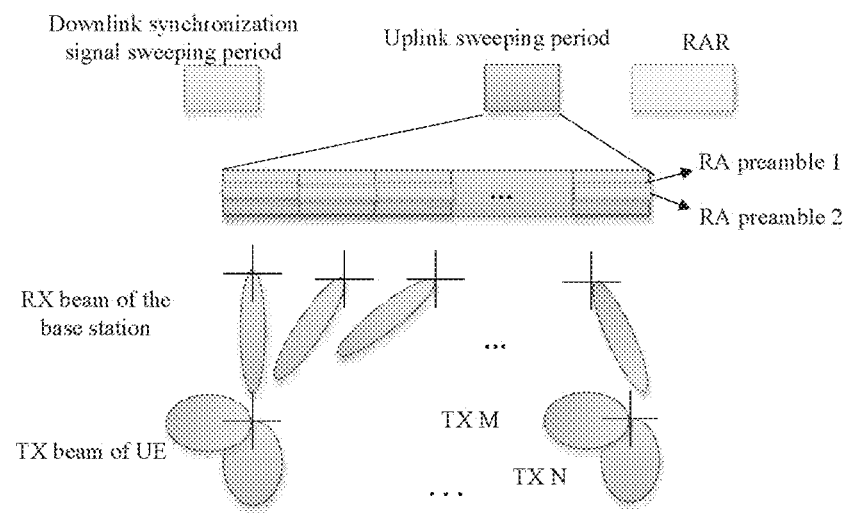
FIG. 12 shows an example in which the UE transmits two different RA preambles in one sweeping period to the available RX beam of the base station on the same frequency resources by using two TX beams simultaneously.

In this implementation, in each sweeping period of the plurality of sweeping periods, the UE may transmit different RA preambles to the plurality of RX beams of the base station on the same physical resource by using the plurality of TX beams associated with this sweeping period. FIG. 12 shows an example in which, in the eighth implementation, the UE transmits two different RA preambles in one sweeping period to the available RX beam of the base station on the same frequency resource by using two TX beams simultaneously.

At the base station side, the base station may utilize the plurality of RX beams to receive a plurality of RA preambles transmitted by the UE in each sweeping period, and transmit the RARs in response to each RA preamble, where each RAR is scrambled by using the RNTI corresponding to the RA preamble.

At the UE side, the UE may receive a plurality of RARs transmitted by the base station using the available TX beam of the base station, and descramble at least one of the plurality of RARs by using the RNTIs corresponding to various transmitted RA preambles respectively, so as to determine the RNTIs by which the at least one of the RARs is successfully descrambled, then, the UE may determine the TX beam by which the RA preamble corresponding to one of the determined RNTIs is transmitted as the available TX beam of the UE. For example, the UE may descramble all of the plurality of RARs by using the RNTIs corresponding to various transmitted RA preambles respectively, so as to determine the RNTIs by which the plurality of RARs are successfully descrambled, then, the UE may select an RNTI from the determined RNTIs, and determine the TX beam by which the RA preamble corresponding to one of the determined RNTIs is transmitted as the available TX beam of the UE. Alternatively, the UE may descramble the plurality of RARs one by one by using the RNTIs corresponding to various transmitted RA preambles respectively, so as to determine a first RNTI by which achieving successful descrambling, and determine the TX beam by which the RA preamble corresponding to the determined RNTI is transmitted as the available TX beam of the UE.

Through the above method, the available TX beam and available RX beam of the UE can be determined. In addition, the available TX beam of the base station can be determined and implicitly notified to the base station.

Next, a beam determining method performed by a base station according to the first embodiment of the present disclosure will be described. Since most of the operations of the method have been described above when describing the beam determining method performed by the UE, the description of the same content is omitted here to avoid redundancy.

Figure 13:
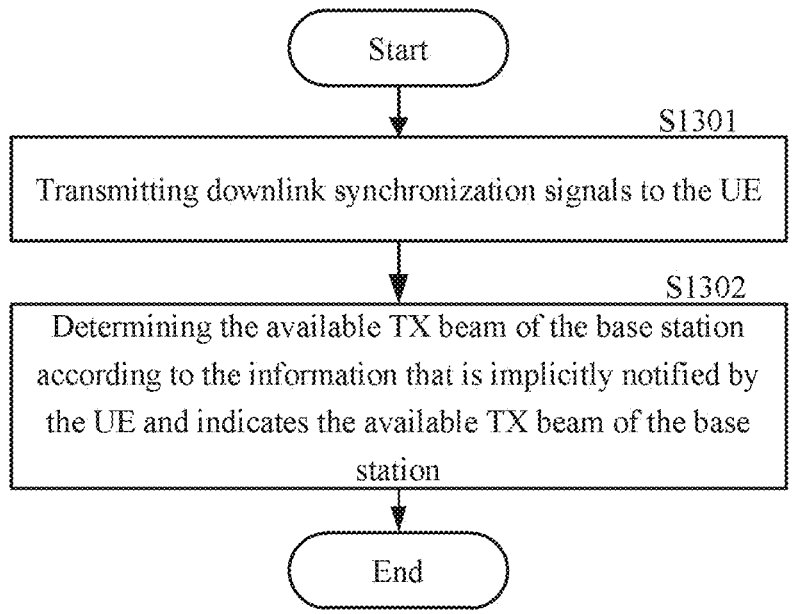
FIG. 13 is a flowchart of a beam determining method performed by a base station during an uplink random access procedure according to a first embodiment of the present disclosure.

FIG. 13 illustrates a beam determining method performed by a base station according to the first embodiment of the present disclosure. Through this method, the base station can determine the available RX beam of the base station and the available TX beam of the UE, and implicitly notify the UE of the determined available TX beam of the UE. In addition, the base station may further determine the available TX beam of the base station according to signals transmitted by the UE.

As shown in FIG. 13, in step S1301, the base station may transmit downlink synchronization signals to the UE. For example, in each sweeping period of the plurality of sweeping periods, the base station may transmit a plurality of downlink synchronization signals to the UE by using the plurality of TX beams, where each TX beam corresponds to one time unit of the sweeping period. Here, the base station may perform step S1301 in the manner described above with reference to step S301 of FIG. 3, and details are not described herein again.

In step S1302, the base station may determine the available TX beam of the base station according to the information that is implicitly notified by the UE and indicates the available TX beam of the base station.

In the case where the base station supports correspondence, as described above, the UE may transmit the RA preambles to the base station on time resources corresponding to the available TX beam of the base station. Specifically, a corresponding relationship between the time resources of various RA preambles on which the UE can transmit and various TX beams of the base station may be preset in the base station and in the UE, or the corresponding relationship may be set in the base station and the base station transmits the RACH configuration indicating the corresponding relationship to the UE. In this way, the UE may determine the time resources of the RA preamble corresponding to the available TX beam of the base station according to the corresponding relationship, and transmit the RA preamble to the base station on this time resources. Accordingly, the base station may receive the RA preamble transmitted by the UE in the sweeping period, and determine, in the plurality of TX beams of the base station, the TX beam corresponding to the time resources of the channel used by the received RA, as the available TX beam of the base station.

In the case where the base station does not support correspondence, as described above, the UE may determine, according to the RACH configuration which is transmitted by the base station and includes information indicating each TX beam of the base station and the RA preamble associated with this TX beam, the RA preamble associated with the available TX beam of the base station, and transmit the RA preamble associated with the available TX beam of the base station to the base station. As described above, the association relationship between each TX beam of the base station and the RA preambles transmitted by the UE may be preset in the base station and in the UE, or the association relationship may be set in the base station, and the RACH configuration which includes information indicating this association relationship (i.e., the RACH configuration indicating each TX beam of the base station and the RA preamble associated with this TX beam) is transmitted to the UE. Accordingly, the base station may receive the RA preamble transmitted by the UE, and determine the TX beam associated with the received RA preamble as the available TX beam of the base station.

In this way, the base station may determine the available TX beam of the base station according to the implicit notification of the UE. Furthermore, through transmitting downlink synchronization signals, the UE can be made to determine its available RX beam.

As described above, in order to efficiently perform RA and other communication procedures, the available TX beam of the UE and the available RX beam of the base station are then determined. Also, in the first embodiment of the present disclosure, this procedure may have different implementations depending on whether the UE and the base station support correspondence and the number of TX beams that the UE can use in one sweeping period.

In a first implementation, both the UE and the base station support correspondence. In this implementation, the base station may determine, by utilizing correspondence, the available RX beam of the base station according to the available TX beam of the base station.

In a second implementation, the UE supports correspondence, and the base station does not support correspondence. In this implementation, in one or more sweeping periods, the base station may use the plurality of RX beams to receive the RA preambles transmitted by the UE, and determine the RA preamble that satisfies the condition from a plurality of RA preambles received in one or more sweeping periods. As described above, the condition may be any condition set as needed. For example, the condition may be the reception quality being the best, or the reception quality exceeding a certain preset threshold. Then, the base station may determine the RX beam by which the determined RA preamble is received as the available RX beam of the base station.

In a third implementation, the UE does not support correspondence, or the UE supports correspondence but does not use correspondence, and the base station supports correspondence. This implementation corresponds to the third to fifth implementations described above with reference to FIG. 3.

In this implementation, the base station may determine, by utilizing correspondence, the available RX beam of the base station according to the available TX beam of the base station. Then, in each sweeping period of the plurality of sweeping periods, the base station may use the available RX beam of the base station to receive the RA preambles associated with this sweeping period and transmitted by the UE, and determine, among the received plurality of RA preambles, at least one of the RA preambles that satisfies the condition, and transmit at least one of the RARs to the UE by using the available TX beam of the base station in response to the determined at least one of the RA preambles respectively, where each RAR is scrambled by using the RNTI corresponding to the determined corresponding RA preamble.

Alternatively, the base station may determine, by utilizing correspondence, the available RX beam of the base station according to the available TX beam of the base station. Then, in each sweeping period of the plurality of sweeping periods, the base station may use the available RX beam of the base station to receive the RA preamble associated with this sweeping period and transmitted by the UE, and determine, among the received plurality of RA preambles, at least one of the RA preambles that satisfies the condition, and transmit at least one of the RARs to the UE by using the available TX beam of the base station in response to the determined at least one of preambles, where each RAR is transmitted by using physical resources associated with the physical resources of the corresponding RA preamble and determined based on the predetermined association relationship between the physical resources of the RARs and the physical resources of the RA preambles.

The details of the above operations have been described above in the third to fifth implementations described in accordance with FIG. 3, and thus will not be described again herein.

In a fourth implementation, neither the UE nor the base station supports correspondence, or the UE and the base station support correspondence but do not use correspondence. This implementation corresponds to the sixth to eighth implementations described above with reference to FIG. 3.

In this implementation, in each sweeping period of the plurality of sweeping periods, the base station may use the plurality of RX beams to receive the RA preambles associated with this sweeping period and transmitted by the UE, and determine, in a plurality of RA preambles received in each sweeping period, the RA preamble that satisfies the condition, and transmit the RAR to the UE by using the available TX beam of the base station in response to the RA preamble determined for each sweeping period, where the RAR is scrambled by using the RNTI corresponding to the corresponding RA preamble.

Alternatively, in each sweeping period of the plurality of sweeping periods, the base station may use the plurality of RX beams to receive the RA preambles associated with this sweeping period and transmitted by the UE, and determine, in a plurality of RA preambles received in each sweeping period, the RA preamble that satisfies the condition, and transmit the RAR to the UE by using the available TX beam of the base station in response to the RA preamble determined for each sweeping period, where the RAR is transmitted by using the physical resources which is determined based on a predetermined association relationship between the physical resources of the RAR and the physical resources of the RA preambles and corresponds to the physical resources of the corresponding RA preamble.

The details of the above operations have been described above in the sixth to eighth implementations described in accordance with FIG. 3, and thus will not be described again herein.

Thus, with the beam determining method performed by the base station according to the embodiments of the present disclosure, the available TX beam and the available RX beam of the base station can be determined, and the available TX beam of the UE is implicitly notified to the UE.

Next, a UE according to the first embodiment of the present disclosure will be described with reference to FIG. 14. The UE can perform the beam determining method described above. Since the operations of the UE are substantially the same as the steps of the beam determining method described above, only a brief description thereof will be described herein, and a repeated description of the same content will be omitted.

Figure 14:
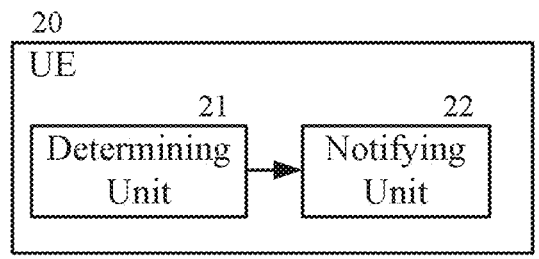
FIG. 14 shows a block diagram of a UE according to a first embodiment of the present disclosure.

As shown in FIG. 14, a UE 20 includes a determining unit 21 and a notifying unit 22. It is to be acknowledged that FIG. 14 only shows components related to the embodiments of the present disclosure, while other components are omitted, but this is merely illustrative, and the UE 20 may include other components as needed.

The determining unit 21 may determine an available RX beam of the UE and an available TX beam of the base station according to downlink synchronization signals transmitted by the base station. Specifically, in each sweeping period of the plurality of sweeping periods, the determining unit 21 may receive, by using one RX beam corresponding to this sweeping period, the downlink synchronization signals transmitted by the base station using the plurality of TX beams, and select one downlink synchronization signal that satisfies a condition from the various downlink synchronization signals received in the plurality of sweeping periods, and then determine the RX beam by which the selected downlink synchronization signal is received as the available RX beam of the UE, and determine the TX beam of the base station corresponding to the time unit in which the selected downlink synchronization signal is received as the available TX beam of the base station.

The notifying unit 22 may implicitly notify the base station of information indicating the available TX beam of the base station.

In embodiments of the present disclosure, according to whether the base station supports correspondence, the available TX beam of the base station may be implicitly notified to the base station in different manners. Specifically, whether the base station supports correspondence can be determined according to the RACH configuration which is transmitted by the base station and includes information indicating whether the base station supports correspondence.

In the case where the base station supports correspondence, the notifying unit 22 may transmit the RA preamble to the base station on time resources corresponding to the available TX beam of the base station. Specifically, a corresponding relationship between the time resources of various RA preambles on which the UE can transmit and various TX beams of the base station may be preset in the base station and in the UE, or the corresponding relationship may be set in the base station and the RACH configuration indicating this corresponding relationship is transmitted to the UE. In this way, the notifying unit 22 may determine the time resources of the RA preamble corresponding to the available TX beam of the base station according to the corresponding relationship, and transmit the RA preamble to the base station on this time resources.

In the case where the base station does not support correspondence, the notifying unit 22 may determine, according to the RACH configuration which is transmitted by the base station and includes information indicating each TX beam of the base station and the RA preamble associated with this TX beam, the RA preamble associated with the available TX beam of the base station, and transmit the RA preamble associated with the available TX beam of the base station to the base station (e.g., to any RX beam of the base station)

As described above, in order to efficiently perform RA and other communication procedures, the available TX beam of the UE and the available RX beam of the base station may also be determined. In the first embodiment of the present disclosure, this procedure may have different implementations depending on whether the UE and the base station support correspondence and the number of TX beams that the UE can use in one sweeping period. As described above, the UE may determine whether the base station supports correspondence according to the RACH configuration which is transmitted by the base station and includes information indicating whether the base station supports correspondence. Of course, if the UE knows in advance whether the base station supports correspondence, the base station is not required to notify the UE whether the base station supports correspondence through the RACH configuration, and the UE is not required to perform the above determination.

In a first implementation, the UE supports correspondence, and the base station also supports correspondence. In this implementation, the determining unit 21 may determine, by utilizing correspondence, the available TX beam of the UE according to the available RX beam of the UE.

In a second implementation, the UE supports correspondence, and the base station does not support correspondence, or the base station supports correspondence but does not notify the UE of the base station supporting correspondence, thereby not using correspondence. In this implementation, the determining unit 21 may determine, by utilizing correspondence, the available TX beam of the UE according to the available RX beam of the UE. The notifying unit 22 may then transmit the RA preambles to the plurality of RX beams of the base station using the available TX beam of the UE during a sweeping period.

In a third implementation, the UE does not support correspondence, or the UE supports correspondence but does not use correspondence, the base station supports correspondence, and in one sweeping period the UE transmits the RA preambles to the base station by using one TX beam.

In this implementation, the determining unit 21 may determine, by utilizing correspondence, the available RX beam of the base station according to the available TX beam of the base station. Then, in each sweeping period of the plurality of sweeping periods, the notifying unit 22 may transmit the RA preambles associated with this sweeping period to the available RX beam of the base station by using one TX beam associated with this sweeping period.

Specifically, in a first example of this implementation, in the case where the offset (x) of the sweeping period in which the UE transmits the RA preambles relative to the sweeping period in which the base station transmits the downlink synchronization signals is notified by the RACH configuration received from the base station, in each sweeping period of the plurality of sweeping periods, the notifying unit 22 may transmit the RA preambles associated with this sweeping period to the available RX beam of the base station by using one TX beam, where the TX beams associated with different sweeping periods are different, and the RA preambles associated with different sweeping periods are different. In a second example of the implementation, in the case where the offset (x) of the sweeping period in which the UE transmits the RA preambles relative to the sweeping period in which the base station transmits the downlink synchronization signals and the length (y) of the sweeping period in which the UE transmits the RA preambles are notified by the RACH configuration received from the base station, in each sweeping period of the plurality of sweeping periods, the notifying unit 22 may transmit the RA preambles to the plurality of RX beams of the base station by using one TX beam, where the TX beams used in different sweeping periods can be different, but the RA preambles transmitted in different sweeping periods are the same. Of course, in some cases, the TX beams used in different sweeping periods may be the same or different.

In the first example described above in which the base station notifies the UE of the available TX beam of the UE, the base station may calculate the RNTI corresponding to the RA preamble according to the time resources and frequency resources of the determined RA preamble, and transmit the RAR to the UE by utilizing the available TX beam of the base station in response to the determined RA preamble, where the RAR is scrambled by using the determined RNTI. Accordingly, the determining unit 21 may receive the RAR transmitted by the base station, and attempt to descramble the received RAR by utilizing the RNTI of each RA preamble respectively, so as to determine the RNTI by which the RAR is successfully descrambled, then determine the TX beam by which the RA preamble corresponding to the determined RNTI is transmitted as the available TX beam of the UE.

In the second example described above in which the base station notifies the UE of the available TX beam of the UE, the base station may use the physical resources corresponding to the RA which corresponds to the physical resources of the determined RA preamble based on a predetermined association relationship between the physical resources of the RAR and the physical resources of the RA preamble, to transmit the RAR, which is transmitted in response to the determined RA preamble, to the UE by the available TX beam of the base station. Accordingly, the determining unit 21 may receive the RAR transmitted by the base station using the available TX beam of the base station, and determine the RA preamble which is transmitted by using the physical resources that associates with the physical resources of the received RAR based on a predetermined association relationship between the physical resources of the RAR and the physical resources of the RA preambles, and determine the TX beam by which the determined RA preamble is transmitted as the available TX beam of the UE.

In a fourth implementation, the UE does not support correspondence, or the UE supports correspondence but does not use correspondence, the base station supports correspondence, and in one sweeping period, the UE can transmit RA preambles to the base station on different physical resources by using a plurality of TX beams simultaneously.

In this implementation, the determining unit 21 may determine, by utilizing correspondence, the available RX beam of the base station according to the available TX beam of the base station. Then, in each sweeping period of the plurality of sweeping periods, the notifying unit 22 may transmit the RA preambles associated with this sweeping period to the available RX beam of the base station on different physical resources by using a plurality of TX beams associated with this sweeping period. Here, the RA preambles transmitted by the plurality of TX beams within the same sweeping period are the same. Specifically, in each sweeping period of the plurality of sweeping periods, the notifying unit 22 may transmit the RA preamble associated with this sweeping period to the available RX beam of the base station on different physical resources by using a plurality of TX beams associated with this sweeping period, where the TX beams associated with different sweeping periods are different from each other, and in the case where the offset (x) of the sweeping period in which the UE transmits the RA preambles relative to the sweeping period in which the base station transmits the downlink synchronization signals is notified by the RACH configuration received from the base station, the RA preambles associated with different sweeping periods can be different from each other, and in the case where the offset (x) of the sweeping period in which the UE transmits the RA preambles relative to the sweeping period in which the base station transmits the downlink synchronization signals and the length (y) of the sweeping period in which the UE transmits the RA preambles are notified by the RACH configuration received from the base station, the RA preambles associated with different sweeping periods can be the same to each other.

Besides, the determining unit 21 may receive the RAR transmitted by the base station, and descramble the received RAR by utilizing the RNTIs of various RA preambles respectively, so as to determine the RNTI by which the RAR is successfully descrambled. Then, the determining unit 21 may determine the TX beam by which the RA preamble corresponding to the determined RNTI is transmitted as the available TX beam of the UE.

In a fifth implementation, the UE does not support correspondence, or the UE supports correspondence but does not use correspondence, the base station supports correspondence, and in one sweeping period, the UE can transmit different RA preambles to the base station on the same physical resources by using the plurality of TX beams simultaneously.

In this implementation, the determining unit 21 may determine, by utilizing correspondence, the available RX beam of the base station according to the available TX beam of the base station. Then, in each sweeping period of the plurality of sweeping periods, the notifying unit 22 may transmit different RA preambles to the available RX beam of the base station on the same physical resources by using the plurality of TX beams associated with the sweeping period.

Besides, the determining unit 21 may receive a plurality of RARs transmitted by the base station using the available TX beam of the base station, and descramble at least one of the plurality of RARs by using the RNTIs corresponding to various transmitted RA preambles respectively, so as to determine the RNTIs by which the at least one of the RARs is successfully descrambled, then, the determining unit 21 may determine the TX beam by which the RA preamble corresponding to one of the determined RNTIs is transmitted as the available TX beam of the UE.

In a sixth implementation, neither the UE nor the base station supports correspondence, or the UE and the base station support correspondence but do not use correspondence, and in one sweeping period, the UE may transmit different RA preambles to the base station by using one TX beam.

In this implementation, in each sweeping period of the plurality of sweeping periods, the notifying unit 22 may transmit the RA preamble associated with this sweeping period to the plurality of RX beams of the base station by using one TX beam associated with this sweeping period.

Specifically, in a first example of the implementation, in the case where the offset (x) of the sweeping period in which the UE transmits the RA preamble relative to the sweeping period in which the base station transmits the downlink synchronization signals is notified by the RACH configuration received from the base station, in each sweeping period of the plurality of sweeping periods, the notifying unit 22 may transmit the RA preamble associated with this sweeping period to the plurality of RX beams of the base station by using one TX beam associated with this sweeping period, where the TX beams associated with different sweeping periods are different, and the RA preambles associated with different sweeping periods are different.

In the first example described above in which the base station notifies the UE of the available TX beam of the UE, the base station may transmit an RAR by using the available TX beam of the base station in response to the RA preamble determined for each sweeping period, where the RAR is scrambled by using the RNTI corresponding to the corresponding RA preamble. Accordingly, the determining unit 21 may receive a plurality of RARs transmitted by the base station using the available TX beam of the base station, and descramble at least one of the plurality of RARs by using the RNTIs corresponding to the RA preambles transmitted in each sweeping period respectively, so as to determine the RNTIs by which the at least one of the RARs is successfully descrambled, then determine the TX beam by which the RA preamble corresponding to one of the determined RNTIs is transmitted as the available TX beam of the UE In the second example described above in which the base station notifies the UE of the available TX beam of the UE, the base station may use the physical resources corresponding to the RA which corresponds to the physical resources of the determined RA preamble based on a predetermined association relationship between the physical resources of the RAR and the physical resources of the RA preambles, and transmit the RARs, which is transmitted in response to the determined RA preambles, to the UE by the available TX beam of the base station. Accordingly, the determining unit 21 may receive a plurality of RARs transmitted by the base station using the available TX beam of the base station, and determine the RA preambles associated with the received at least one of the plurality of RARs based on a predetermined association relationship between the physical resources of the RAR and the physical resources of the RA preambles, thereby determining the TX beam by which one of the determined RA preambles is transmitted as the available TX beam of the UE.

In a seventh implementation, neither the UE nor the base station supports correspondence, or the UE and the base station support correspondence but do not use correspondence, and in one sweeping period, the UE may transmit the same RA preamble to the base station on different frequency resources by using the plurality of TX beams.

In this implementation, in each sweeping period of the plurality of sweeping periods, the notifying unit 22 may transmit the RA preamble to the plurality of RX beams of the base station on different physical resources by using a plurality of TX beams associated with this sweeping period.

Besides, the determining unit 21 may receive at least one of the RARs transmitted by the base station, and descramble the received at least one of the RARs by utilizing the RNTI of various RA preambles respectively, so as to determine at least one of the RNTIs by which the at least one of the RARs is successfully descrambled. Then, the UE may determine the TX beam by which the RA preamble corresponding to the determined one of the RNTIs is transmitted as the available TX beam of the UE.

In an eighth implementation, neither the UE nor the base station supports correspondence, or the UE and the base station support correspondence but do not use correspondence, and in one sweeping period, the UE may transmit different RA preambles to the base station on the same frequency resource by using the plurality of TX beams.

In this implementation, in each sweeping period of the plurality of sweeping periods, the notifying unit 22 may transmit different RA preambles to the plurality of RX beams of the base station on the same physical resource by using the plurality of TX beams associated with this sweeping period.

Besides, the determining unit 21 may receive a plurality of RARs transmitted by the base station using the available TX beam of the base station, and descramble at least one of the plurality of RARs by using the RNTIs corresponding to various transmitted RA preambles respectively, so as to determine the RNTIs by which the at least one of the RARs is successfully descrambled, then, the UE may determine the TX beam by which the RA preamble corresponding to one of the determined RNTIs is transmitted as the available TX beam of the UE.

Next, a base station according to the first embodiment of the present disclosure will be described with reference to FIG. 15. The base station can perform the beam determining method described above. Since the operations of the base station is substantially the same as the steps of the beam determining method described above, only a brief description thereof will be described herein, and a repeated description of the same content will be omitted.

Figure 15:
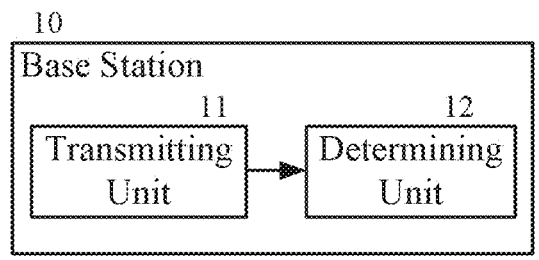
FIG. 15 shows a block diagram of a base station according to a first embodiment of the present disclosure.

As shown in FIG. 15, a base station 10 includes a transmitting unit 11 and a determining unit 12. It is to be appreciated that FIG. 15 only shows components related to the embodiments of the present disclosure, while other components are omitted, but this is merely illustrative, and the base station 10 may include other components as needed.

The transmitting unit 11 may transmit downlink synchronization signals to the UE. For example, in each sweeping period of the plurality of sweeping periods, the transmitting unit 11 may transmit a plurality of downlink synchronization signals to the UE by using the plurality of TX beams, where each TX beam corresponds to one time unit of the sweeping period.

The determining unit 12 may determine the available TX beam of the base station according to the information that is implicitly notified by the UE and indicates the available TX beam of the base station.

In the case where the base station supports correspondence, as described above, the corresponding relationship between the time resources of various RA preambles on which the UE can transmit and various TX beams of the base station may be preset in the base station and in the UE, or the corresponding relationship may be set in the base station and the base station transmits the RACH configuration that includes information indicating this corresponding relationship to the UE. In this way, the UE may determine the time resources of the RA preamble corresponding to the available TX beam of the base station according to the corresponding relationship, and transmit the RA preamble to the base station on this time resources. Accordingly, the determining unit 12 may receive the RA preamble transmitted by the UE in the sweeping period, and determine, in the plurality of TX beams of the base station, the TX beam corresponding to the time resources of the channel used by the received RA, as the available TX beam of the base station.

In the case where the base station does not support correspondence, as described above, the UE may determine, according to the RACH configuration which is transmitted by the base station and includes information indicating each TX beam of the base station and the RA preamble associated with this TX beam, the RA preamble associated with available the TX beam of the base station, and transmit the RA preamble associated with the available TX beam of the base station to the base station. Accordingly, the determining unit 12 may receive the RA preamble transmitted by the UE, and determine the TX beam associated with the received RA preambles as the available TX beam of the base station.

In this way, the base station may determine the available TX beam of the base station according to the implicit notification of the UE. Furthermore, through transmitting downlink synchronization signals, the UE can be made to determine its available RX beam.

As described above, in order to efficiently perform RA and other communication procedures, the available TX beam of the UE and the available RX beam of the base station are then determined. Also, in the first embodiment of the present disclosure, this procedure may have different implementations depending on whether the UE and the base station support correspondence and the number of TX beams that the UE can use in one sweeping period.

In a first implementation, both the UE and the base station support correspondence. In this implementation, the determining unit 12 may determine, by utilizing correspondence, the available RX beam of the base station according to the available TX beam of the base station.

In a second implementation, the UE supports correspondence, and the base station does not support correspondence. In this implementation, the determining unit 12 may use the plurality of RX beams to receive the RA preambles transmitted by the UE in the sweeping period, and determine, among the received plurality of RA preambles, the RA preamble that satisfies the condition. Then, the determining unit 12 may determine the RX beam by which the determined RA preamble is received as the available RX beam of the base station.

In a third implementation, the UE does not support correspondence, or the UE supports correspondence but does not use correspondence, and the base station supports correspondence. This implementation corresponds to the third to fifth implementations described above with reference to FIG. 3. This implementation corresponds to the third to fifth implementations described above with reference to FIG. 3.

In this implementation, the determining unit 12 may determine, by utilizing correspondence, the available RX beam of the base station according to the available TX beam of the base station. Then, in each sweeping period of the plurality of sweeping periods, the transmitting unit 11 may use the available RX beam of the base station to receive the RA preambles associated with this sweeping period and transmitted by the UE, and determine, among the received plurality of RA preambles, at least one of the RA preambles that satisfies the condition, and transmit at least one of the RARs to the UE by using the available TX beam of the base station in response to the determined at least one of the RA preambles respectively, where each RAR is scrambled by using the RNTI corresponding to the determined corresponding RA preamble.

Alternatively, the determining unit 12 may determine, by utilizing correspondence, the available RX beam of the base station according to the available TX beam of the base station. Then, in each sweeping period of the plurality of sweeping periods, the transmitting unit 11 may use the available RX beam of the base station to receive the RA preamble associated with this sweeping period and transmitted by the UE, and determine, among the received plurality of RA preambles, at least one of the RA preambles that satisfies the condition, and transmit at least one of the RARs to the UE by using the available TX beam of the base station in response to the determined at least one of preambles, where each RAR is transmitted by using physical resources associated with the physical resources of the corresponding RA preamble and determined based on the predetermined association relationship between the physical resources of the RAR and the physical resources of the RA preambles.

The details of the above operations have been described above in the third to fifth implementations described in accordance with FIG. 3, and thus will not be described again herein.

In a fourth implementation, neither the UE nor the base station supports correspondence, or the UE and the base station support correspondence but do not use correspondence. This implementation corresponds to the sixth to eighth implementations described above with reference to FIG. 3.

In this implementation, in each sweeping period of the plurality of sweeping periods, the determining unit 12 may use the plurality of RX beams to receive the RA preambles associated with this sweeping period and transmitted by the UE, and determine, in a plurality of RA preambles received in each sweeping period, the RA preamble that satisfies the condition, and the transmitting unit 11 may transmit the RAR by using the available TX beam of the base station in response to the RA preamble determined for each sweeping period, where the RAR is scrambled by using the RNTI corresponding to the corresponding RA preamble.

Alternatively, in each sweeping period of the plurality of sweeping periods, the determining unit 12 may use the plurality of RX beams to receive the RA preambles associated with this sweeping period and transmitted by the UE, and determine, in a plurality of RA preambles received in each sweeping period, the RA preamble that satisfies the condition, and the transmitting unit 11 may transmit the RAR to the UE by using the available TX beam of the base station in response to the RA preamble determined for each sweeping period, where the RAR is transmitted by using the physical resources which is determined based on a predetermined association relationship between the physical resources of the RAR and the physical resources of the RA preambles and corresponds to the physical resources of the corresponding RA preamble.

The details of the above operations have been described above in the sixth to eighth implementations described in accordance with FIG. 3, and thus will not be described again herein.

Second Embodiment

Hereinafter, a beam determining method according to a second embodiment of the present disclosure will be described. In the second embodiment, the UE has omnidirectional antennas, and the base station has a plurality of directional antennas, such that the UE transmits and receives signals through omnidirectional beams, and the base station transmits and receives signals by using a plurality of TX beams and a plurality of RX beams.

First, a beam determining method performed by the UE according to the second embodiment of the present disclosure will be described with reference to FIG. 16.

Figure 16:
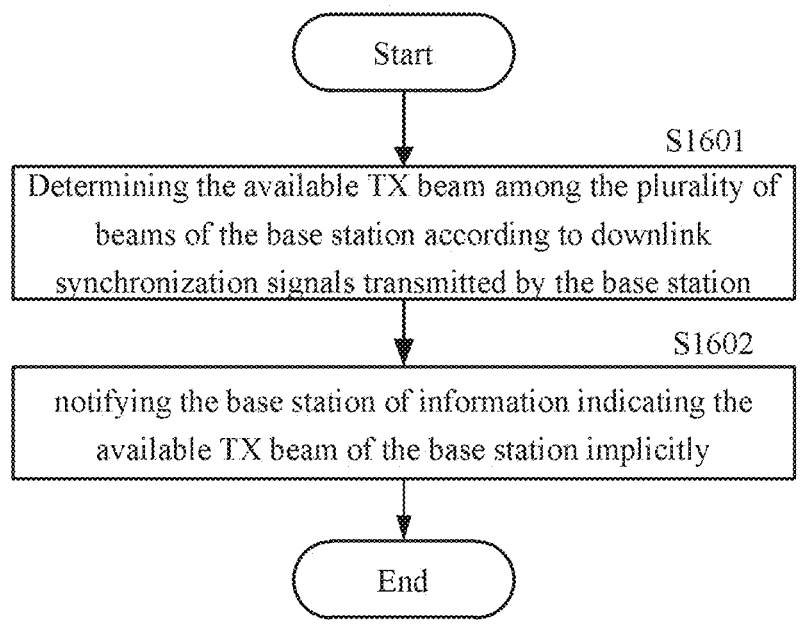
FIG. 16 is a flowchart of a beam determining method performed by a UE in an uplink random access procedure according to a second embodiment of the present disclosure.

As shown in FIG. 16, in step S1601, an available TX beam among the plurality of beams of the base station is determined according to downlink synchronization signals transmitted by the base station.

Specifically, in order to determine the available TX beam of the base station from the plurality of TX beams of the base station, a sweeping period may be set, where this sweeping period may include a plurality of time units (symbols), and the number of the time units may be the same as the number of the TX beams of the base station. The base station may transmit downlink synchronization signals to the UE in each time unit of the sweeping period by using one TX beam corresponding to this time unit, that is, the base station may perform sweeping of the TX beam, so that in each sweeping period the downlink synchronization signals may be transmitted once by using all of the TX beams of the base station respectively. The UE may receive, in the sweeping period, the downlink synchronization signals transmitted by the base station using the plurality of TX beams.

Then, the UE may select one downlink synchronization signal that satisfies the condition from the various downlink synchronization signals received in the sweeping period. As described above, the condition may be any condition set as needed. Next, the UE may determine the TX beam of the base station corresponding to the time unit in which the selected downlink synchronization signal is received as the available TX beam of the base station. The sweeping manner of the base station (in other words, the corresponding relationship between various TX beams of the base station and various time units (symbols) in the sweeping period) may be preset in the UE and in the base station, or may be set by the base station and notified to the UE through RACH configuration.

Next, in step S1602, information indicating the available TX beam of the base station is implicitly notified to the base station.

In the second embodiment, according to whether the base station supports correspondence, the available TX beam of the base station may be implicitly notified to the base station in different manners. Specifically, whether the base station supports correspondence can be determined according to the RACH configuration which is transmitted by the base station and includes information indicating whether the base station supports correspondence. Alternatively, the information indicating whether the base station supports correspondence may be preset in the UE, in this case the UE does not need to determine whether the base station supports correspondence through the RACH configuration.

In the case where the base station supports correspondence, the RA preambles may be transmitted to the base station on time resources corresponding to the available TX beam of the base station.

Specifically, a corresponding relationship between time resources of various RA preambles on which the UE can transmit and various TX beams of the base station may be preset in the base station and in the UE, or the corresponding relationship may be set in the base station and the RACH configuration which includes information indicating this corresponding relationship is transmitted to the UE. In this way, the UE may determine the time resources of the RA preamble corresponding to the available TX beam of the base station according to the corresponding relationship, and transmit the RA preamble to the base station on this time resources. In this way, when receiving the RA preambles transmitted by the UE, the base station may determine the TX beam corresponding to the time resources used by the preambles as the available TX beam of the base station according to the corresponding relationship.

In the case where the base station does not support correspondence, the RA preamble associated with the available TX beam of the base station can be determined according to the RACH configuration, which is transmitted by the base station and includes information indicating each TX beam of the base station and the RA preamble associated with this TX beam, and the RA preamble associated with the available TX beam of the base station is transmitted to the base station. Specifically, an association relationship between each TX beam of the base station and the RA preamble transmitted by the UE may be preset in the base station and in the UE, or the association relationship may be set in the base station and the RACH configuration which includes information indicating this association relationship (i.e., the RACH configuration indicating each TX beam of the base station and the RA preamble associated with this TX beam) is transmitted to the UE. In this way, the UE may determine, according to the association relationship, the RA preamble associated with the available TX beam of the base station, and transmit the RA preamble associated with the available TX beam of the base station to the base station. When receiving the RA preamble transmitted by the UE, the base station may determine the TX beam associated with the RA preamble as the available TX beam of the base station. Here, the association relationship between the TX beam of the base station and the RA preamble may be set in any suitable manner. For example, RA preambles may be divided into a plurality of groups according to the indexes of the RA preambles, and each TX beam of the base station corresponds to a RA preamble group.

In this manner, the UE can determine the available TX beam of the base station and implicitly notify it to the base station.

In addition to determining the available TX beam of the base station, it is also necessary to determine the available RX beam of the base stations.

In the case where the base station supports correspondence, the base station may determine, by utilizing correspondence, the available RX beam of the base station according to the available TX beam notified by the UE, thus it is not necessary to determine the available RX beam of the base station by causing the UE to transmit the RA preambles to the base station.

In the case where the base station does not support correspondence, the UE may transmit RA preambles to the plurality of RX beams of the base station in the sweeping period. In this case, the base station may receive RA preambles transmitted by the UE by using a plurality of TX beams, and determine, among the received plurality of RA preambles, the RA preamble that satisfies the condition. As described above, the conditions can be set as needed. The base station can then determine the RX beam by which the determined RA preamble is received as the available RX beam of the base station.

Next, a beam determining method performed by the base station according to the second embodiment of the present disclosure will be described with reference to FIG. 17.

Figure 17:
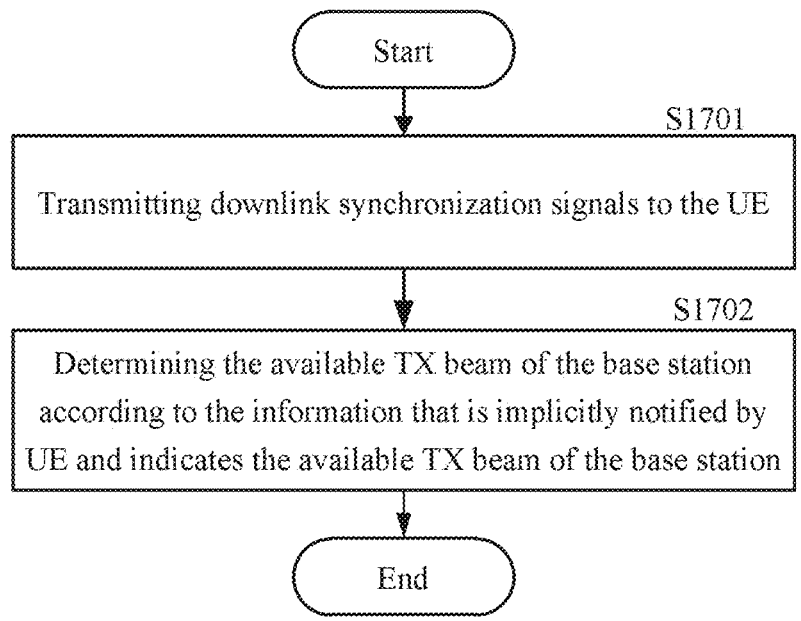
FIG. 17 is a flowchart of a beam determining method performed by a base station in an uplink random access procedure according to a second embodiment of the present disclosure.

As shown in FIG. 17, in step S1701, the base station may transmit downlink synchronization signals to the UE. For example, in each sweeping period of the plurality of scan periods, the base station may transmit a plurality of downlink synchronization signals to the UE by using a plurality of TX beams, where each TX beam corresponds to one time unit of the sweeping period. Here, the base station may perform step S1701 in the manner described above with reference to step S301 of FIG. 3, and details are not described herein again.

In step S1702, the base station may determine the available TX beam of the base station according to the information that is implicitly notified by the UE and indicates the available TX beam of the base station.

In the case where the base station supports correspondence, as described above, the UE may transmit the RA preambles to the base station on time resources corresponding to the available TX beam of the base station. Specifically, a corresponding relationship between the time resources of various RA preambles on which the UE can transmit and various TX beams of the base station may be preset in the base station and in the UE, or the corresponding relationship may be set in the base station and the base station transmits the RACH configuration indicating this corresponding relationship to the UE. In this way, the UE may determine the time resources of the RA preamble corresponding to the available TX beam of the base station according to the corresponding relationship, and transmit the RA preamble to the base station on this time resources. Accordingly, the base station may receive the RA preamble transmitted by the UE in the sweeping period, and determine, in the plurality of TX beams of the base station, the TX beam corresponding to the time resources of the channel used by the received RA, as the available TX beam of the base station.

Then, the base station may determine, by utilizing correspondence, the available RX beam of the base station according to the available TX beam of the base station.

In the case where the base station does not support correspondence, as described above, the UE may determine, according to the RACH configuration which is transmitted by the base station and includes information indicating each TX beam of the base station and the RA preamble associated with this TX beam, the RA preamble associated with the available TX beam of the base station, and transmit the RA preamble associated with the available TX beam of the base station to the base station. As described above, the association relationship between each TX beam of the base station and the RA preambles transmitted by the UE may be preset in the base station and in the UE, or the association relationship may be set in the base station, and the RACH configuration which includes information indicating this association relationship (i.e., the RACH configuration indicating each TX beam of the base station and the RA preamble associated with this TX beam) is transmitted to the UE. Accordingly, the base station may receive the RA preamble transmitted by the UE, and determine the TX beam associated with the received RA preamble as the available TX beam of the base station.

In addition, the base station may receive a plurality of RA preambles transmitted by the UE by using a plurality of RX beams in the sweeping period, and determine, among the received plurality of RA preambles, the RA preamble that satisfies the condition, and determine the RX beam by which the determined RA preamble is received as the available RX beam of the base station.

In this way, the base station can determine the available RX beam of the base station.

Next, a UE according to the second embodiment of the present disclosure will be described with reference to FIG. 18. The UE can perform the beam determining method described above. Since the operations of the UE are substantially the same as the steps of the beam determining method described above, only a brief description thereof will be described herein, and a repeated description of the same content will be omitted.

Figure 18:
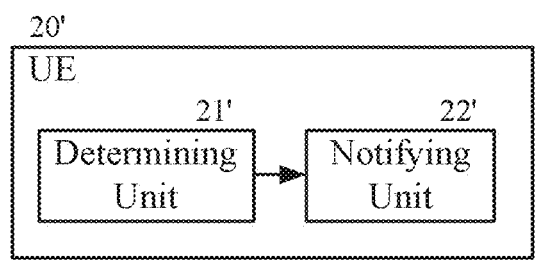
FIG. 18 shows a block diagram of a UE according to a second embodiment of the present disclosure.

As shown in FIG. 18, a UE 20' includes a determining unit 21' and a notifying unit 22'. It is to be appreciated that FIG. 18 only shows components related to embodiments of the present disclosure, while other components are omitted, but this is merely illustrative, and the UE 20' may include other components as needed.

The determining unit 21' may determine an available TX beam among the plurality of beams of the base station according to downlink synchronization signals transmitted by the base station.

Specifically, in order to determine the available TX beam of the base station from the plurality of TX beams of the base station, a sweeping period may be set, where this sweeping period may include a plurality of time units (symbols), and the number of the time units may be the same as the number of the TX beams of the base station. The base station may transmit downlink synchronization signals to the UE in each time unit of the sweeping period by using one TX beam corresponding to this time unit, that is, the base station may perform sweeping of the TX beam, so that in each sweeping period the downlink synchronization signals may be transmitted once by using all of the TX beams of the base station respectively. The determining unit 21' may receive, in the sweeping period, the downlink synchronization signals transmitted by the base station using the plurality of TX beams.

Then, the determining unit 21' may select one downlink synchronization signal that satisfies the condition from the various downlink synchronization signals received in the sweeping period. As described above, the condition may be any condition set as needed. Next, the determining unit 21' may determine the TX beam of the base station corresponding to the time unit in which the selected downlink synchronization signal is received as the available TX beam of the base station. The sweeping manner of the base station (in other words, the corresponding relationship between various TX beams of the base station and various time units (symbols) in the sweeping period) may be preset in the UE and in the base station, or may be set by the base station and notified to the UE through RACH configuration.

The notifying unit 22' may implicitly notify information indicating the available TX beam of the base station to the base station.

In the second embodiment, according to whether the base station supports correspondence, the notifying unit 22' may implicitly notify the base station of the available TX beam of the base station in different manners. Specifically, the notifying unit 22' can determine whether the base station supports correspondence according to the RACH configuration, which is transmitted by the base station and includes information indicating whether the base station supports correspondence. Alternatively, the information indicating whether the base station supports correspondence may be preset in the UE, in this case the UE does not need to determine whether the base station supports correspondence through the RACH configuration.

In the case where the base station supports correspondence, the notifying unit 22' may transmit the RA preambles to the base station on time resources corresponding to the available TX beam of the base station. Specifically, a corresponding relationship between the time resources of various RA preambles on which the UE can transmit and various TX beams of the base station may be preset in the base station and in the UE, or the corresponding relationship may be set in the base station and the RACH configuration which includes information indicating this corresponding relationship is transmitted to the UE. In this way, the notifying unit 22' may determine the time resources of the RA preamble corresponding to the available TX beam of the base station according to the corresponding relationship, and transmit the RA preamble to the base station on this time resources. In this way, when receiving the RA preambles transmitted by the UE, the base station may determine the TX beam corresponding to the time resources used by the preambles as the available TX beam of the base station according to the corresponding relationship.

In the case where the base station does not support correspondence, the notifying unit 22' may determine the RA preamble associated with the available TX beam of the base station according to the RACH configuration, which is transmitted by the base station and includes information indicating each TX beam of the base station and the RA preamble associated with this TX beam, and transmits the RA preamble associated with the available TX beam of the base station to the base station. Specifically, an association relationship between each TX beam of the base station and the RA preamble transmitted by the UE may be preset in the base station and in the UE, or the association relationship may be set in the base station and the RACH configuration which includes information indicating this association relationship (i.e., the RACH configuration indicating each TX beam of the base station and the RA preamble associated with this TX beam) is transmitted to the UE. In this way, the notifying unit 22' may determine, according to the association relationship, the RA preamble associated with the available TX beam of the base station, and transmit the RA preamble associated with the available TX beam of the base station to the base station. When receiving the RA preamble transmitted by the UE, the base station may determine the TX beam associated with the RA preamble as the available TX beam of the base station.

In this manner, the UE may determine the available TX beams of the base station and implicitly notify it to the base station.

In addition to determining the available TX beam of the base station, it is also necessary to determine the available RX beam of the base stations.

In the case where the base station supports correspondence, the base station may determine, by utilizing correspondence, the available RX beam of the base station according to the available TX beam notified by the UE, thus it is not necessary to determine the available RX beam of the base station by causing the UE to transmit the RA preambles to the base station.

In the case where the base station does not support correspondence, the notifying unit 22' may transmit RA preambles to the plurality of RX beams of the base station in the sweeping period. In this case, the base station may receive RA preambles transmitted by the UE by using a plurality of TX beams, and determine, among the received plurality of RA preambles, the RA preamble that satisfies the condition. As described above, the conditions can be set as needed. The base station can then determine the RX beam by which the determined RA preamble is received as the available RX beam of the base station.

Next, a base station according to the second embodiment of the present disclosure, which can perform the beam determining method described above, will be described with reference to FIG. 19. Since the operations of the base station are substantially the same as the steps of the beam determining method described above, only a brief description thereof will be described herein, and a repeated description of the same content will be omitted.

Figure 19:
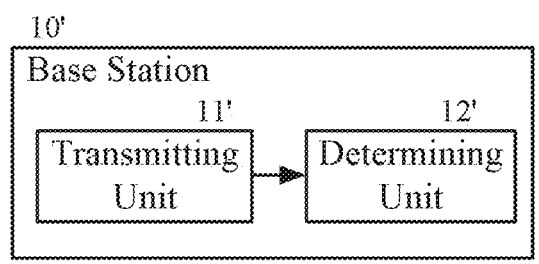
FIG. 19 shows a block diagram of a base station according to a second embodiment of the present disclosure.

As shown in FIG. 19, a base station 10' includes a transmitting unit 11' and a determining unit 12'. It will be appreciated that FIG. 19 only shows components related to the embodiments of the present disclosure, while other components are omitted, but this is merely illustrative, and the base station 10' may include other components as desired.

As shown in FIG. 19, the transmitting unit 11' may transmit downlink synchronization signals to the UE. For example, in each sweeping period of the plurality of scan periods, the transmitting unit 11' may transmit a plurality of downlink synchronization signals to the UE by using a plurality of TX beams, where each TX beam corresponds to one time unit of the sweeping period. Here, the transmitting unit 11' may perform step S1301 in the manner described above with reference to step S301 of FIG. 3, and details are not described herein again.

The determining unit 12' may determine the available TX beam of the base station according to the information that is implicitly notified by the UE and indicates the available TX beam of the base station.

In the case where the base station supports correspondence, as described above, the UE may transmit the RA preambles to the base station on time resources corresponding to the available TX beam of the base station. Specifically, a corresponding relationship between the time resources of various RA preambles on which the UE can transmit and various TX beams of the base station may be preset in the base station and in the UE, or the corresponding relationship may be set in the base station and the base station transmits the RACH configuration indicating this corresponding relationship to the UE. In this way, the UE may determine the time resources of the RA preamble corresponding to the available TX beam of the base station according to the corresponding relationship, and transmit the RA preamble to the base station on this time resources. Accordingly, the determining unit 12' may receive the RA preamble transmitted by the UE in the sweeping period, and determine, in the plurality of TX beams of the base station, the TX beam corresponding to the time resources of the channel used by the received RA, as the available TX beam of the base station.

Then, the determining unit 12' may determine, by utilizing correspondence, the available RX beam of the base station according to the available TX beam of the base station.

In the case where the base station does not support correspondence, as described above, the UE may determine, according to the RACH configuration which is transmitted by the base station and includes information indicating each TX beam of the base station and the RA preamble associated with this TX beam, the RA preamble associated with the available TX beam of the base station and transmit the RA preamble associated with the available TX beam of the base station to the base station. As described above, the association relationship between each TX beam of the base station and the RA preambles transmitted by the UE may be preset in the base station and in the UE, or the association relationship may be set in the base station, and the RACH configuration which includes information indicating this association relationship (i.e., the RACH configuration indicating each TX beam of the base station and the RA preamble associated with this TX beam) is transmitted to the UE. Accordingly, the determining unit 12' may receive the RA preamble transmitted by the UE, and determine the TX beam associated with the received RA preamble as the available TX beam of the base station.

In addition, the determining unit 12' may receive a plurality of RA preambles transmitted by the UE by using a plurality of RX beams in the sweeping period, and determine, among the received plurality of RA preambles, the RA preamble that satisfies the condition, and determine the RX beam by which the determined RA preamble is received as the available RX beam of the base station.

In this way, the base station can determine the available RX beam of the base station.

Third Embodiment

UE determines an available TX beam of the UE and an available RX beam of a base station in different manners according to whether the base station supports hybrid beam forming. When the base station supports hybrid beam forming, the base station may receive RA preamble transmitted by the UE with an analog beam, and decode the RA preamble with a digital beam.

Specifically, first, the UE may determine the available TX beam of the base station and the available RX beam of the base station. In the third embodiment, the UE may determine, in the same manner as the first embodiment, the available RX beam of the UE and the available TX beam of the base station by using the downlink synchronization signals transmitted by the base station, and details are not described herein again. Then, the UE may implicitly notify the base station of the determined available TX beam of the base station. For example, according to the manner described above, the UE may determine, according to the RACH configuration which is transmitted by the base station and includes information indicating each TX beam of the base station and the RA preamble associated with this TX beam, the RA preamble associated with available the TX beam of the base station and transmit the RA preamble associated with the available TX beam of the base station to the base station, so that the base station may determine the associated TX beam based on the RA preamble as the available TX beam of the base station.

When determining the available TX beam of the UE and the available RX beam of the base station, the UE may determine whether the base station supports hybrid beam forming and accordingly adopt different manners. To this end, information (e.g., 1 bit) indicating whether the base station can support hybrid beam forming may be included in the RACH configuration, and the RACH configuration is transmitted to the UE.

In the case where the UE determines that the base station does not support hybrid beam forming, the UE may transmit the RA preambles to the base station in the manner described with reference to the first embodiment and/or the second embodiment, so as to determine the available RX beam of the base station and the available TX beam of UE, which will not be described again herein.

Figure 20:
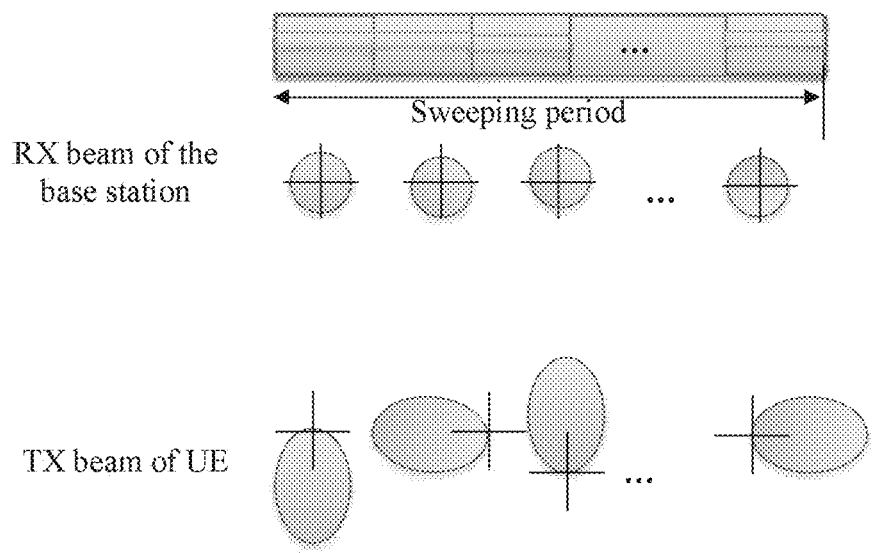
FIG. 20 illustrates an example in which the UE transmits RA preambles when the base station supports hybrid beam forming according to a third embodiment of the present disclosure.

In the case where the UE determines that the base station supports hybrid beam forming, the UE may transmit the RA preambles to the base station in one sweeping period, where the sweeping period includes a plurality of time units, and on each time unit, the UE uses the corresponding TX beam to transmit the RA preambles, wherein the TX beams of the UE used on different time units are different, as shown in FIG. 20.

At the base station side, the base station receives various RA preambles transmitted by the UE by using an analog TX beam, and decodes the received RA preambles by using different digital RX beams, and determines the digital RX beam that satisfies the condition as the available RX beam of the base station, and determines the TX beam of the UE corresponding to the decoded RA preambles as the available TX beam of the UE. The conditions can be appropriately set as needed. For example, the condition may be the quality of the RA preamble obtained by decoding being the best. The base station can then inform the UE of the available TX beam of the UE in an appropriate manner as described above. For example, the base station may transmit an RAR in response to the decoded RA preamble, where the RAR is scrambled by using the RNTI corresponding to the RA preamble, such that the UE may determine the available TX beam of the UE, which is notified by the base station, by using the RNTIs corresponding to various transmitted RA preambles to descramble the RARs transmitted by the base station.

With the above-described beam determining method, the UE, and the base station according to the embodiments of the present disclosure, the preferred TX beam and the preferred RX beam of the UE and the preferred TX beam and the preferred RX beam of the base station can be determined, so as to be able to use the preferred beams in RA performed by the UE to the base station and in subsequent communications.

It should be noted that, in this specification, the terms "including", "comprising" or any other variants are intended to encompass a non-exclusive inclusion, such that a process, method, article, or device that comprises an elements also includes other elements not explicitly listed, or includes elements that are inherent to such a process, method, article, or device. An element that is defined by the phrase "comprising a . . . " does not exclude there are additional equivalent elements in the process, method, article, or device that comprises the element.

Finally, it should also be noted that the series of processes described above include not only processes that are performed in chronological order described herein, but also include processes that are performed in parallel or separately, rather than in chronological order.

Through the description of the above embodiments, those skilled in the art can clearly understand that the present disclosure can be implemented by means of software plus a necessary hardware platform, and of course, all can be implemented by hardware. Based on such understanding, all or part of the technical solutions of the present disclosure contributing to the background art may be embodied in the form of a software product, which may be stored in a storage medium such as a ROM/RAM, a magnetic disk, an optical disk, or the like. A number of instructions are included to cause a computer device (which may be a personal computer, server, or network device, etc.) to perform the methods described in various embodiments of the present disclosure or portions of the embodiments.

The present disclosure has been described in detail above, and the specific embodiments are used herein to explain the principles and embodiments of the present disclosure. The description of the above embodiments is only for helping to understand the method of the present disclosure and its core ideas; meanwhile, there will be changes in the embodiments and the scope of application for those skilled in the art according to the idea of the present disclosure. In summary, the content of the specification should not be construed as limiting the disclosure.

What is claimed is:

1. A user equipment for performing beam selection and in communication with a base station comprising:
a processor coupled to a transceiver, configured to select a transmitting beam among a plurality of transmitting beams of the base station corresponding to downlink synchronization signals transmitted by the base station, wherein a reception quality of the downlink synchronization signals is above a threshold; and
the processor coupled to the transceiver further configured to transmit a random access preamble to the base station on time-frequency resources corresponding to the selected transmitting beam of the base station,
wherein a corresponding relationship between various transmitting beams of the base station and various random access preambles is configured in the user equipment,
the processor coupled to the transceiver selects the random access preamble associated with the selected transmitting beam of the base station according to the configured corresponding relationship,
transmits the random access preamble associated with the selected transmitting beam to the base station,
receives a random access channel (RACH) configuration including information regarding a time length between the time-frequency resources and a response to the random access preamble, and
controls to receive the response based on the information.

2. The user equipment of claim 1, wherein the processor coupled to the transceiver selects the time-frequency resources of the random access preamble corresponding to the selected transmitting beam of the base station according to a corresponding relationship between time-frequency resources of the random access preambles and the various transmitting beams of the base station.

3. A beam selection method performed by a user equipment in communication with a base station, comprising:
selecting a transmitting beam among a plurality of transmitting beams of the base station corresponding to downlink synchronization signals transmitted by the base station, wherein a reception quality of the downlink synchronization signals is above a threshold;
transmitting a random access preamble to the base station on time-frequency resources corresponding to the selected transmitting beam of the base station,
wherein a corresponding relationship between various transmitting beams of the base station and various random access preambles is configured in the user equipment, and the method further comprises:
selecting the random access preamble associated with the selected transmitting beam of the base station according to the configured corresponding relationship;
transmitting the random access preamble associated with the selected transmitting beam to the base station,
receiving a random access channel (RACH) configuration including information regarding a time length between the time-frequency resources and a response to the random access preamble, and
controlling to receive the response based on the information.

4. The method of claim 3, wherein selecting the time-frequency resources of the random access preamble corresponding to the selected transmitting beam of the base station according to a corresponding relationship between time-frequency resources of the random access preambles and the various transmitting beams of the base station.

5. A base station comprising:
a processor coupled to a transceiver, configured to transmit, to a user equipment, a plurality of transmitting beams corresponding to downlink synchronization signals to select a transmitting beam among the plurality of transmitting beams by the user equipment, wherein a reception quality of the downlink synchronization signals, selected by the user equipment, is above a threshold; and
the processor coupled to the transceiver further configured to receive a random access preamble on time-frequency resources corresponding to the selected transmitting beam,
wherein the processor coupled to the transceiver transmits a corresponding relationship between various transmitting beams and various random access preambles to the user equipment,
the processor coupled to the transceiver receives the random access preamble associated with the selected transmitting beam selected by the user equipment according to the corresponding relationship,
transmits a random access channel (RACH) configuration including information regarding a time length between the time-frequency resources and a response to the random access preamble, and
controls to transmit the response based on the information.

6. A system comprising a base station and a user equipment, wherein:
the base station comprises:
a first processor coupled to a transceiver, configured to transmit, to the user equipment, a plurality of transmitting beams corresponding to downlink synchronization signals to select a transmitting beam among the plurality of transmitting beams by the user equipment, wherein a reception quality of the downlink synchronization signals, selected by the user equipment, is above a threshold; and
the first processor coupled to the transceiver further configured to receive a random access preamble on time-frequency resources corresponding to the selected transmitting beam,
wherein the first processor coupled to the transceiver transmits a corresponding relationship between various transmitting beams and various random access preambles to the user equipment,
the first processor coupled to the transceiver receives the random access preamble associated with the selected transmitting beam selected by the user equipment according to the corresponding relationship,
transmits a random access channel (RACH) configuration including information regarding a time length between the time-frequency resources and a response to the random access preamble, and
controls to transmit the response based on the information, and the user equipment comprises:
- a second processor coupled to a second transceiver, configured to select the transmitting beam among the plurality of transmitting beams corresponding to the downlink synchronization signals, wherein the reception quality of the downlink synchronization signals is above the threshold; and
- the second processor coupled to the second transceiver further configured to transmit the random access preamble to the base station on the time-frequency resources corresponding to the selected transmitting beam of the base station,
- wherein the second processor coupled to the second transceiver of the user equipment selects the random access preamble according to the corresponding relationship transmitted by the base station,
- transmits the random access preamble to the base station,
- receives the RACH configuration including the information, and
- controls to receive the response based on the information.

* * * * *